US009990958B2

(12) United States Patent
Fukuta

(10) Patent No.: US 9,990,958 B2
(45) Date of Patent: Jun. 5, 2018

(54) PLAYBACK APPARATUS, METHOD FOR THE SAME, AND RECORDING MEDIUM

(71) Applicant: Sony Corporation, Tokyo (JP)

(72) Inventor: Shinya Fukuta, Saitama (JP)

(73) Assignee: SONY CORPORATION, Tokyo (JP)

( * ) Notice: Subject to any disclaimer, the term of this patent is extended or adjusted under 35 U.S.C. 154(b) by 238 days.

(21) Appl. No.: 14/109,247

(22) Filed: Dec. 17, 2013

(65) Prior Publication Data
US 2014/0153899 A1 Jun. 5, 2014

Related U.S. Application Data

(63) Continuation of application No. 11/272,199, filed on Nov. 10, 2005, now Pat. No. 8,634,698.

(30) Foreign Application Priority Data

Nov. 11, 2004 (JP) .................................. 2004-327879

(51) Int. Cl.
*H04N 5/77* (2006.01)
*H04N 9/80* (2006.01)
(Continued)

(52) U.S. Cl.
CPC .......... *G11B 27/309* (2013.01); *G11B 27/105* (2013.01); *G11B 27/322* (2013.01); *G11B 27/34* (2013.01); *H04N 5/77* (2013.01); *H04N 5/907* (2013.01); *H04N 9/87* (2013.01); *H04N 5/781* (2013.01); *H04N 5/85* (2013.01); *H04N 9/7921* (2013.01); *H04N 9/8227* (2013.01)

(58) Field of Classification Search
None
See application file for complete search history.

(56) References Cited

U.S. PATENT DOCUMENTS 7,212,731 B1 * 5/2007 Morotomi ............ G11B 19/025
348/E5.024
2002/0135608 A1 9/2002 Hamada et al.
(Continued)

FOREIGN PATENT DOCUMENTS

JP 2000-011615 1/2000
JP 2000-331466 A 11/2000
(Continued)

*Primary Examiner* — Hung Dang
(74) *Attorney, Agent, or Firm* — Chip Law Group

(57) ABSTRACT

A playback apparatus loaded with a data recording medium including image data includes a first determining unit configured to determine whether a user stopped playing back the image data, a storage control unit configured to control a storage process so that a first set of information indicating a position where the playback of the image data was stopped is stored when the first determining unit determines that the user stopped playback of the image data, and a display control unit configured to control a screen to display a list of thumbnail images with an icon superposed on a thumbnail image corresponding to the image data stopped on the basis of the first set of information when the first determining unit determines that the user stopped playback of the image data, the icon indicating that playback of the image data is resumed from the position where the playback of the image data was stopped.

16 Claims, 18 Drawing Sheets

(51) Int. Cl.
  *G11B 27/30* (2006.01)
  *G11B 27/10* (2006.01)
  *G11B 27/32* (2006.01)
  *G11B 27/34* (2006.01)
  *H04N 5/907* (2006.01)
  *H04N 9/87* (2006.01)
  *H04N 5/781* (2006.01)
  *H04N 5/85* (2006.01)
  *H04N 9/79* (2006.01)
  *H04N 9/82* (2006.01)

(56) References Cited

U.S. PATENT DOCUMENTS

| | | | |
|---|---|---|---|
| 2003/0063528 A1 | 4/2003 | Ogikubo | |
| 2003/0198463 A1* | 10/2003 | Temple | G11B 27/034 386/241 |
| 2004/0028378 A1* | 2/2004 | Shimizu | G11B 27/002 386/297 |
| 2004/0086264 A1* | 5/2004 | Okada | G11B 27/105 386/329 |
| 2004/0179813 A1 | 9/2004 | Kobayashi | |
| 2005/0076310 A1* | 4/2005 | Tada | G11B 27/34 715/838 |
| 2005/0105888 A1 | 5/2005 | Hamada et al. | |
| 2005/0149977 A1* | 7/2005 | Nakamura | H04N 5/44543 725/105 |
| 2005/0240878 A1 | 10/2005 | Anthony et al. | |
| 2007/0088752 A1* | 4/2007 | Seo | G11B 27/034 |

FOREIGN PATENT DOCUMENTS

| | | |
|---|---|---|
| JP | 2003-309790 | 10/2003 |
| JP | 2004-032375 | 1/2004 |
| JP | 2004-206774 | 7/2004 |

* cited by examiner

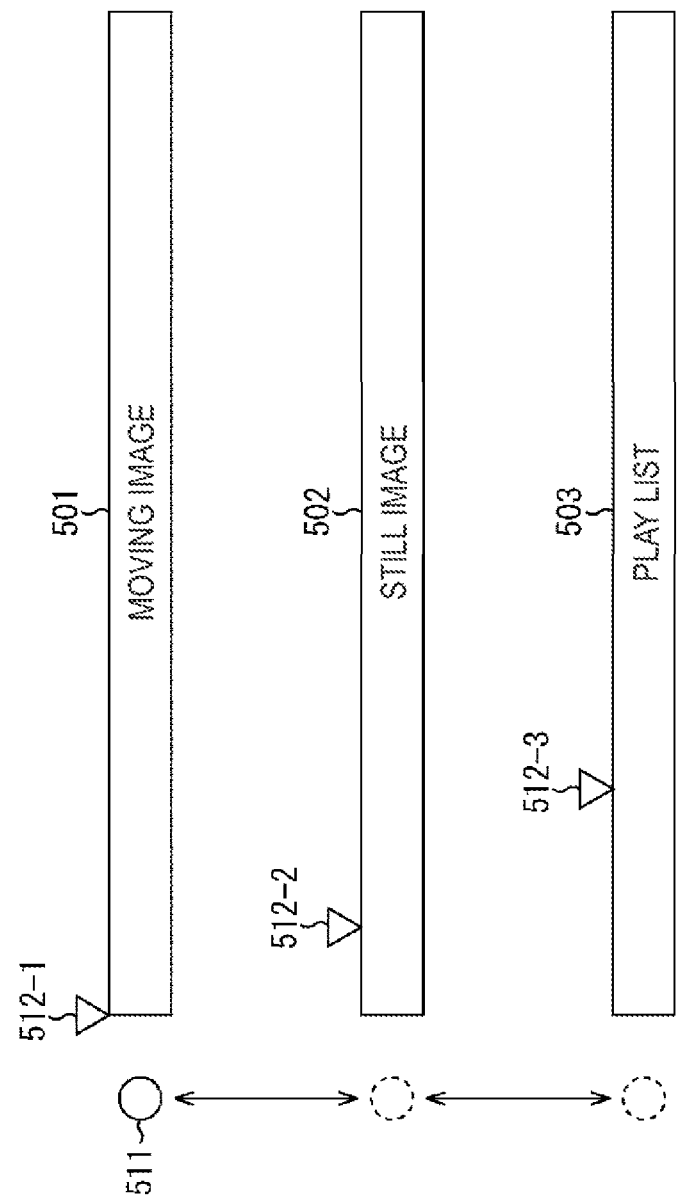

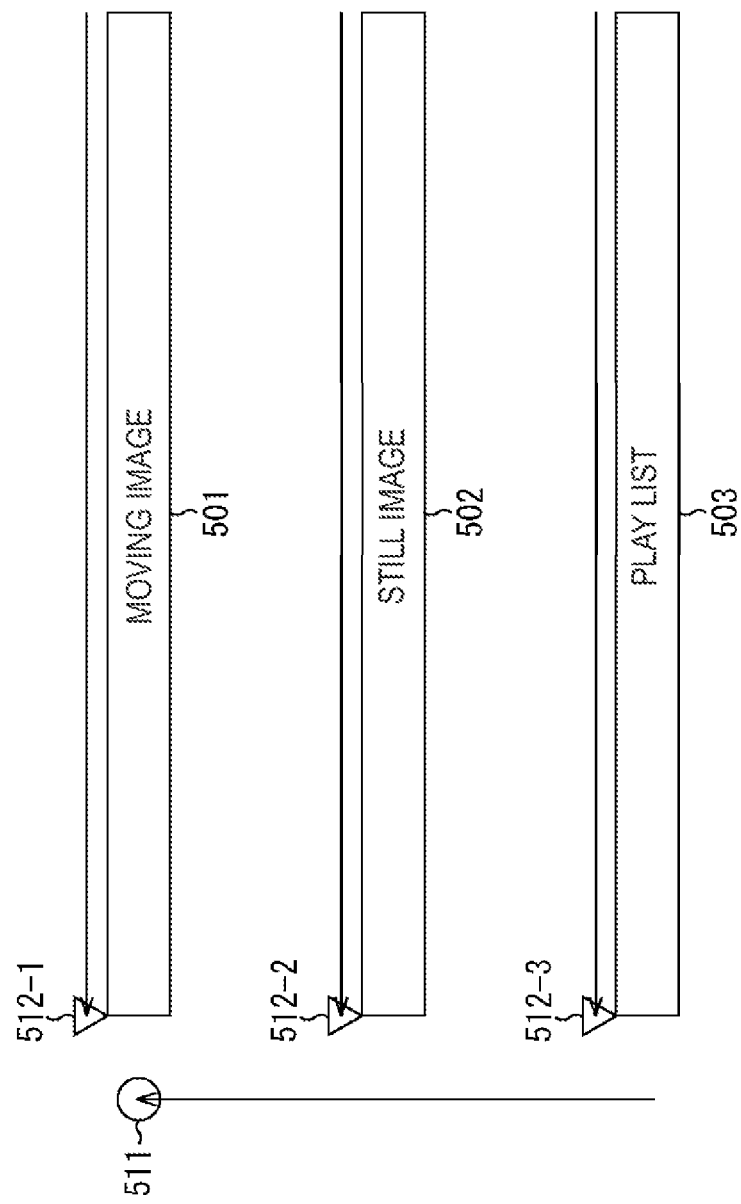

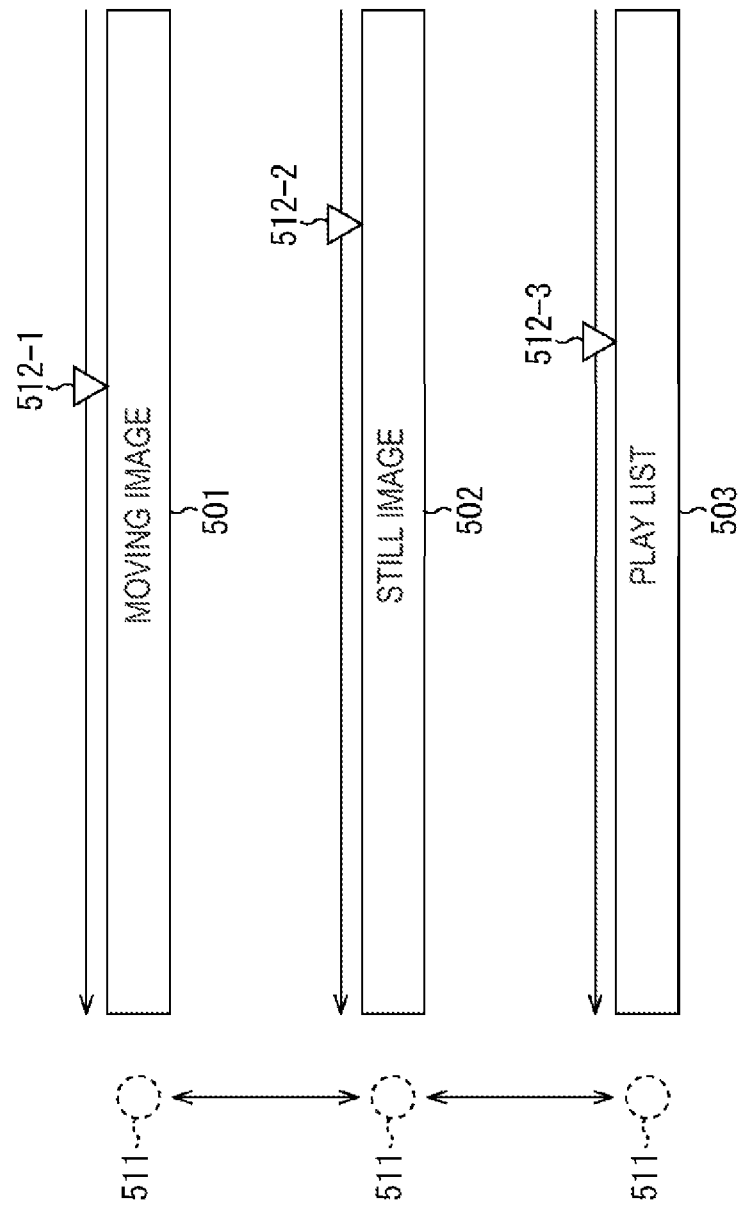

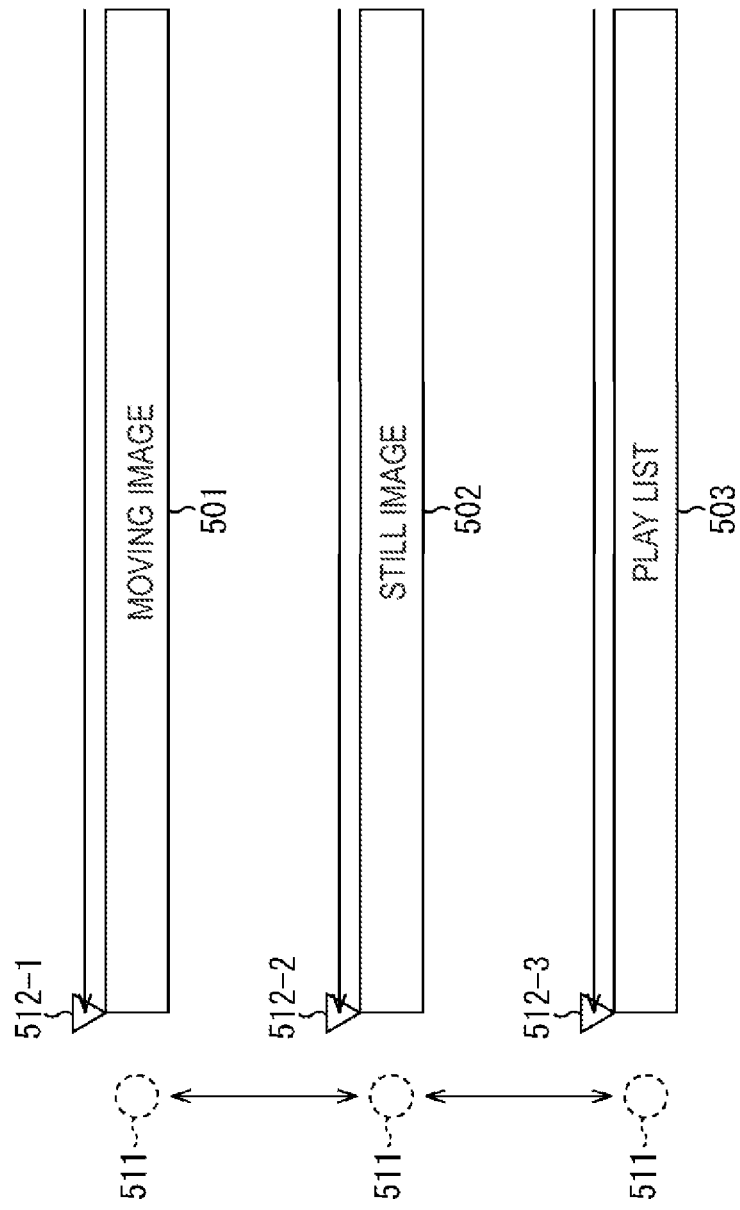

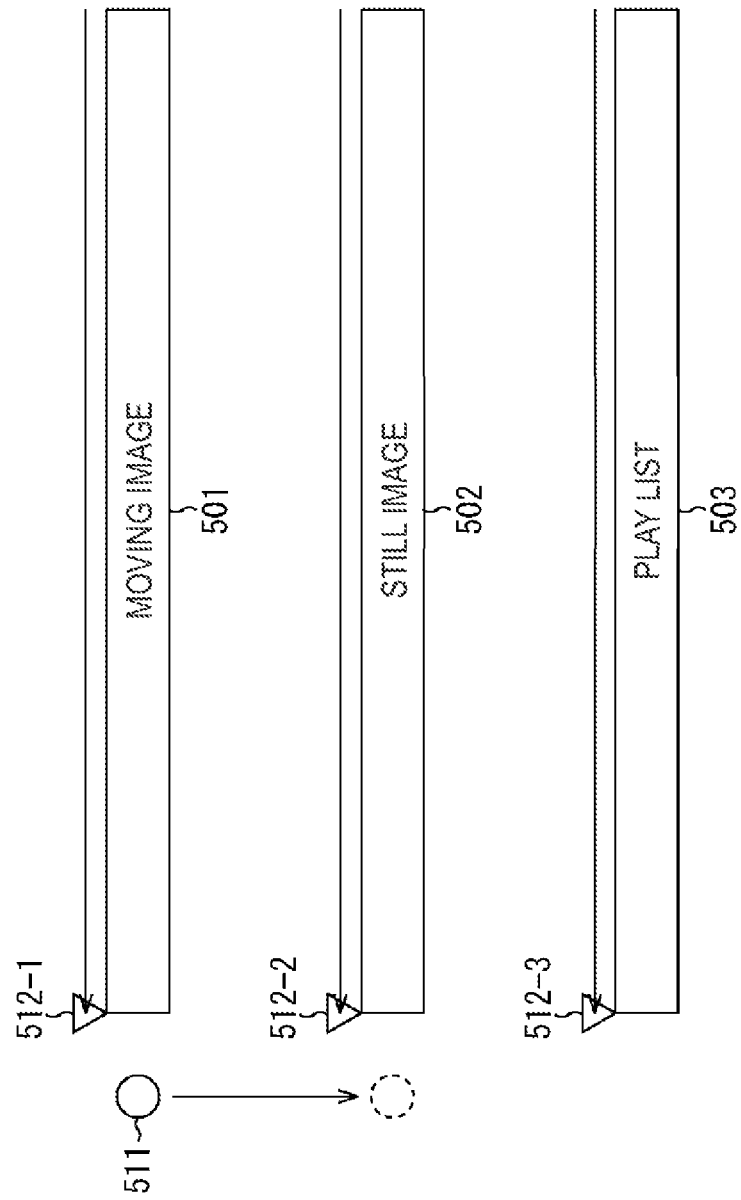

PLAYBACK APPARATUS, METHOD FOR THE SAME, AND RECORDING MEDIUM

CROSS-REFERENCE TO RELATED APPLICATIONS

The present application is a continuation of U.S. application Ser. No. 11/272,199, filed Nov. 10, 2005 which claims priority from Japanese Patent Application No. JP 2004-327879, filed on Nov. 11, 2004, the disclosure of which is hereby incorporated by reference herein.

BACKGROUND OF THE INVENTION

The present invention relates to a playback apparatus, a method for the same, a recording medium, and a program and, more specifically, relates to a playback apparatus, a method for the same, a recording medium, and a program for resuming playback.

Nowadays, video cameras that use optical disks, such as digital versatile disks (DVDs), as recording media are in wide use. Such a digital camera loaded with such an optical disk may have a resume playback function for resuming playback, after pausing, of a moving image (or still images) stored on the optical disk from a position where the playback of the image was stopped. The image is played back from a position based on information on the playback-stop position stored in a memory and is played back by indicating the playback-start point (position) where the image is played back next time.

FIG. 1 illustrates the resume playback function of a known digital video camera.

FIG. 1 illustrates an operation screen of a display unit 11 of a known digital video camera. An operation screen (hereinafter referred to as a "visual index screen") shown in the upper left area of FIG. 11 includes thumbnail display areas 12-1 to 12-6. Each of the thumbnail display areas 12-1 to 12-6 includes a thumbnail image (reduced image) corresponding to image data stored in a recording unit (not shown).

A backward button 13 is operated to display the previous visual index screen. When the user operates the backward button 13, the display unit 11 receives image data for six thumbnail images recorded before the thumbnail images currently being displayed in the thumbnail display areas 12-1 to 12-6 and the six thumbnail images of the received image data are newly displayed in the thumbnail display areas 12-1 to 12-6.

A forward button 14 is operated to display the next visual index screen. When the user operates the forward button 13, the display unit 11 receives image data for six thumbnail images recorded after the thumbnail images currently displayed in the thumbnail display areas 12-1 to 12-6 and the six thumbnail images of the received image data are newly displayed in the thumbnail display areas 12-1 to 12-6.

A moving image tab 15 is operated to display, in the thumbnail display areas 12-1 to 12-6, thumbnail images that correspond to image data of moving images stored in the recording unit. A still image tab 16 is operated to display, in the thumbnail display areas 12-1 to 12-6, thumbnail images corresponding to image data of still images stored in the recording unit.

In other words, the user chooses to operate either the moving image tab 15 or the still image tab 16. The upper left area of FIG. 1 illustrates a visual index screen in which the moving image tab 15 has been selected.

At the visual index screen illustrated in the upper left area of FIG. 1, the display unit 11 displays the moving image illustrated in the upper right area in FIG. 1 on a screen (hereinafter referred to a "playback screen") when the user selects one of the thumbnail images displayed in the thumbnail display areas 12-1 to 12-6 and presses an ENTER key or a PLAY key provided on the known digital video camera. The ENTER key is provided so as to allow the user to finalize his or her operation, and the PLAY key is provided so as to play back a moving image.

At this time, the user pressing a VISUAL INDEX key provided on the known digital video camera so as to display the visual index screen while the selected moving image is displayed on the playback screen causes the display unit 11 to change the screen being displayed from the playback screen to the visual index screen.

The user pressing a STOP key provided on the known digital video camera while the selected moving image is displayed on the play screen, as illustrated in the lower right area in FIG. 11, causes a playback-stop screen having only a data display area 31 to be displayed while the moving image is paused. At this time, since the user pressed the STOP key at a time corresponding to "0:12:12" displayed in a data display area 21 (or the data display area 31 in the play stop screen), resume information including information corresponding to the displayed time "0:12:12" (i.e., playback-stop position) is stored in the recording unit (not shown).

At this time, in the known digital camera, the resume information stored in the recording unit is information including playback-stop information of a moving image or a still image. Therefore, a known digital camera is not capable of simultaneously storing resume information for both a moving image and a still image.

Moreover, since the playback-stop screen only displays text information in the data display area 31 and does not display graphics information, the user may not realize that it is possible to carry out resume playback and may mistakenly carry out undesired operations, such as pressing the STOP key.

If the user presses the PLAY key on the playback-stop screen, a playback screen based on the resume information including information corresponding to the displayed time "0:12:12" is displayed on the display unit 11 and the moving image is played back starting from the time corresponding to "0:12:12" (i.e., the moving image is played back from the point at which the moving image was stopped).

More specifically, even if a recorded moving image is stopped midway through its playback, the moving image can be played back again from the point at which it was stopped if the user presses the PLAY key on the playback-stop screen because resume information is stored in the recording unit.

If the user presses the VISUAL INDEX key on the playback-stop screen, the screen displayed on the display unit 11 changes from the playback-stop screen to the visual index screen.

If the user presses the STOP key on the playback-stop screen, a stop screen not including any images, as illustrated in the lower left area of FIG. 1, is displayed while the playback of an image is stopped and, as indicated by the time, "0:00:00," displayed in a data display area 41 of the stop screen, the resume information is deleted.

If the user presses the VISUAL INDEX key on the stop screen, the screen displayed on the display unit 11 changes from the stop screen to the visual index screen.

A known digital video camera realizes a resume play function in such a manner as described above.

Furthermore, there is a known playback apparatus that allows the user to set a plurality of positions as start positions for playing or recording in addition to a normal start position (i.e., beginning of the first tract) (refer to Japanese Unexamined Patent Application Publication No. 2000-331466.

A known digital video camera that is capable of carrying out resume playback displays a screen not related to the operation to be carried out by the user and, thus, does not provide an interface screen that allows intuitive operation by the user.

A known digital video camera capable of resume playback stores one set of resume information per recording medium. Therefore, if a plurality of playback types, such as moving image and still image, is included in one recording medium, the resume information of the image the user was viewing is deleted when another image is viewed and resume playback of the previous viewed image cannot be carried out.

For example, if the content of one recording medium ranges in a wide variety, such as moving images, still images, and electronic books, when the user starts viewing a moving image, the resume information of a still image that was viewed before will be deleted and the resume playback of the still image cannot be carried out.

SUMMARY OF THE INVENTION

The present invention addresses the above-identified and other problems associated with conventional methods and apparatuses and provides a digital video camera having an interface screen that can be intuitively operated by a user and having a resume playback function that enables resume playback of images even when the images belong to a plurality of playback types by storing resume information of the image.

A playback apparatus according to an embodiment of the present invention loaded with a data recording medium including image data includes first determining means for determining whether a user carried out an operation for stop playing back the image data when the image data is being played back, storage control means for controlling a storage process so that a first set of information indicating a position where the playback of the image data was stopped is stored when the first determining means determines that the user carried out an operation for stop playing back the image data, and display control means for controlling the display of a screen so that a screen displaying a list of thumbnail images with an icon superposed on a thumbnail image corresponding to the image data stopped from being played back is displayed on the basis of the first set of information when the first determining means determines that the user carried out an operation for stop playing back the image data, wherein the icon indicating that playback of the image data is resumed from the position where the playback of the image data was stopped.

The first determining means of the playback apparatus determines whether a user carried out an operation for start playing back the image data when the image data is not being played back, and the playback apparatus further includes a second determining means for determining whether the icon is superposed on the thumbnail image corresponding to the image data being played back when the first determining means determines that an operation for start playing back the image data is carried out by the user, and playback control means for controlling the playback of the image data on the basis of the first set of information so that the image data is played back from the position where the playback of the image data was stopped when the second determining means determines that the icon is superposed on the thumbnail image.

The playback apparatus further includes third determining means for determining the type of the image data, wherein the type of the image data being one of moving image, still image, and play list, the play list being used for selecting moving images or still images and for playing back the selected images in a predetermined order, wherein the storage control means controls the storage process so that the type of the image data based on the determination results of the third determining means is stored as a second set of information and controls the storage process so that, when the image data is being played back, the first set of information is stored by the type of the image data when the first determining means determines that the user carried out an operation for stopping the image data from being played back, and wherein the display control means controls the display of a screen so that a screen displaying a list of thumbnail images with the icon being superposed on a thumbnail image corresponding to the image data stopped from being played back is displayed on the basis of the first set of information and the second set of information.

The display control means of the playback apparatus controls the display of a screen so that a screen displaying a list of thumbnail images with each of the types of image data is displayed.

The playback control means of the playback apparatus controls the playback of the image data so that the image data is played back from the beginning when the second determining means determines that an icon is not superposed on a thumbnail image.

A method for playing back image data with a playback apparatus loaded with a data recording medium including image data according to an embodiment of the present invention includes determining whether a user carried out an operation for stop playing back the image data when the image data is being played back, controlling a storage process so that a first set of information indicating a position where the playback of the image data was stopped is stored when the first determining means determines that the user carried out an operation for stop playing back the image data, and controlling the display of a screen so that a screen displaying a list of thumbnail images with an icon superposed on a thumbnail image corresponding to the image data stopped from being played back is displayed on the basis of the first set of information when the first determining means determines that the user carried out an operation for stop playing back the image data, wherein the icon indicating that playback of the image data is resumed from the position where the playback of the image data was stopped.

A recording medium recorded with a computer-readable program for executing a playback process for processing image data stored on a data recording medium according to an embodiment of the present invention includes determining whether a user carried out an operation for stop playing back the image data when the image data is being played back, controlling a storage process so that a first set of information indicating a position where the playback of the image data was stopped is stored when the first determining means determines that the user carried out an operation for stop playing back the image data, and controlling the display of a screen so that a screen displaying a list of thumbnail images with an icon superposed on a thumbnail image corresponding to the image data stopped from being played back is displayed on the basis of the first set of information when the first determining means determines that the user carried out an operation for stop playing back the image data, wherein the icon indicating that playback of the image data is resumed from the position where the playback of the image data was stopped.

A system for processing image data according to an embodiment of the present invention includes a playback apparatus loaded with a data recording medium including image data and operable to execute instructions; and instructions for playing back the image data, the instructions including determining whether a user carried out an operation for stop playing back the image data when the image data is being played back, controlling a storage process so that a first set of information indicating a position where the playback of the image data was stopped is stored when the first determining means determines that the user carried out an operation for stop playing back the image data, and controlling the display of a screen so that a screen displaying a list of thumbnail images with an icon superposed on a thumbnail image corresponding to the image data stopped from being played back is displayed on the basis of the first set of information when the first determining means determines that the user carried out an operation for stop playing back the image data, wherein the icon indicating that playback of the image data is resumed from the position where the playback of the image data was stopped.

A playback apparatus, a method for the same, a recording medium, or a system according to an embodiment of the present invention is capable of determining whether a user carried out an operation for stop playing back the image data when the image data is being played back, controlling a storage process so that a first set of information indicating a position where the playback of the image data was stopped is stored when the first determining means determines that the user carried out an operation for stop playing back the image data, and controlling the display of a screen so that a screen displaying a list of thumbnail images with an icon superposed on a thumbnail image corresponding to the image data stopped from being played back is displayed on the basis of the first set of information when the first determining means determines that the user carried out an operation for stop playing back the image data, wherein the icon indicating that playback of the image data is resumed from the position where the playback of the image data was stopped.

According to an embodiment of the present invention, an interface screen enabling a user to carry out intuitive operation and to easily carry out playback operation is provided. Moreover, according to an embodiment of the present invention, resume information for a plurality of resume types can be stored. Therefore, even when the images belong to a plurality of playback types resume playback of all types of images is possible, and the operation is improved.

BRIEF DESCRIPTION OF THE DRAWINGS

FIG. 14 illustrates an overview of the resume playback function;

FIG. 15 illustrates the resetting of resume information;

FIG. 16 illustrates the transition of resume information;

FIG. 17 illustrates the transition of resume information after an editing process; and FIG. 18 illustrates the transition of resume information when an optical disk is loaded in a drive.

DETAILED DESCRIPTION

Figure 1:
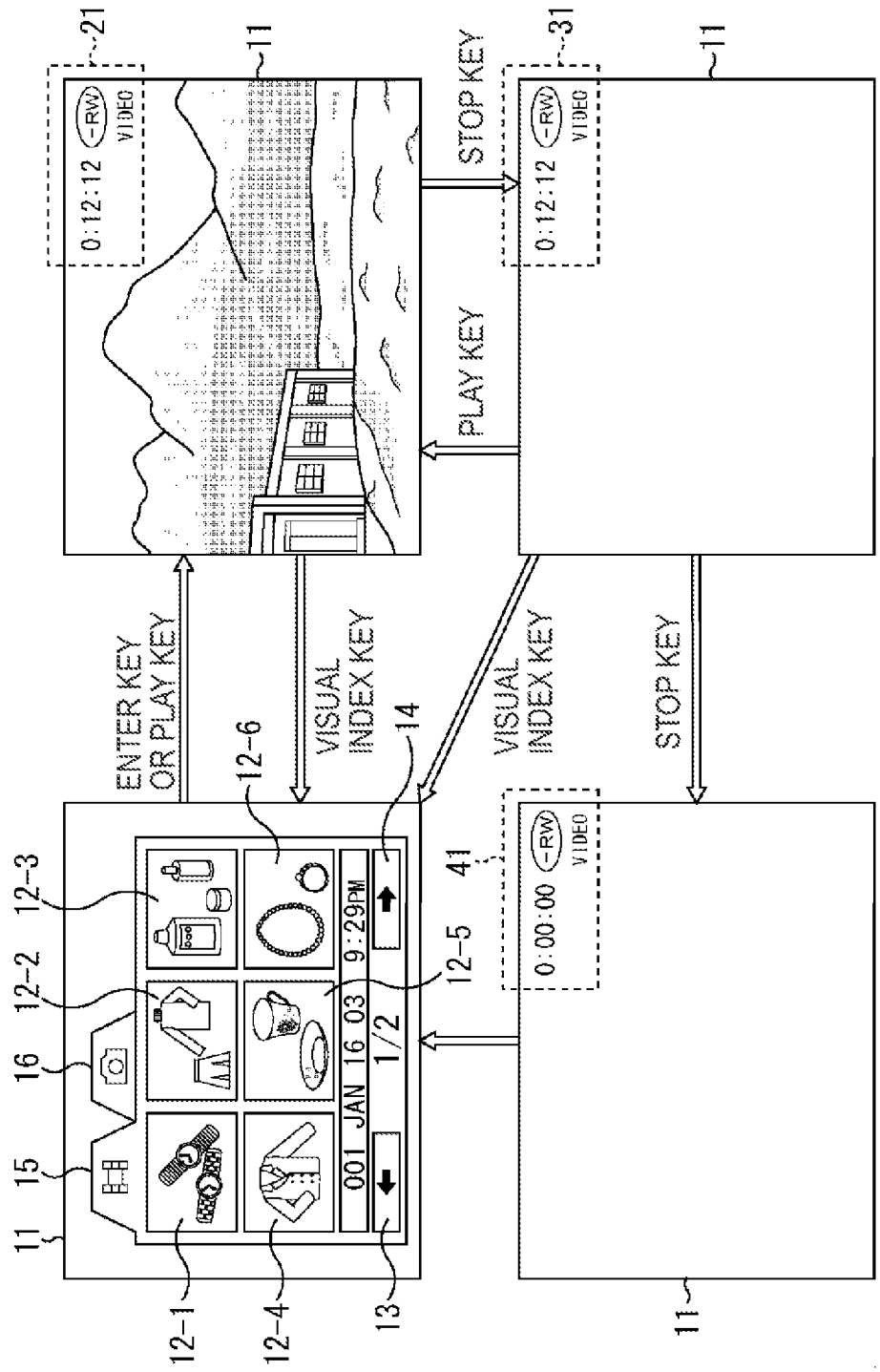
FIG. 1 illustrates a resume playback function of a known digital video camera.

Before describing an embodiment of the present invention, the correspondence between the features of the claims and the specific elements disclosed in an embodiment of the present invention is discussed below. This description is intended to assure that an embodiment(s) supporting the claimed invention are described in this specification. Thus, even if an element in the following embodiment(s) is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

According to an embodiment of the present invention, a playback apparatus is provided. The playback apparatus (for example, the digital video camera 101 illustrated in FIG. 2) includes first determining means (for example, the operation determining unit 214 illustrated in FIG. 3) for determine whether a user carried out an operation for stop playing back the image data when the image data is being played back, storage control means (for example, the resume information storage control unit 212 illustrated in FIG. 3) for controlling a storage process so that a first set of information (for example, a resume point) indicating a position where the playback of the image data was stopped is stored when the first determining means determines that the user carried out an operation for stop playing back the image data, and display control means (for example, the screen display control unit 213 illustrated in FIG. 3) for controlling the display of a screen (for example, a visual index screen) so that a screen displaying a list of thumbnail images with an icon (for example, the resume icon 302 illustrated in FIG. 5) superposed on a thumbnail image corresponding to the image data stopped from being played back is displayed on the basis of the first set of information when the first determining means determines that the user carried out an operation for stop playing back the image data, wherein the icon indicating that playback of the image data is resumed from the position where the playback of the image data was stopped.

Figure 3:
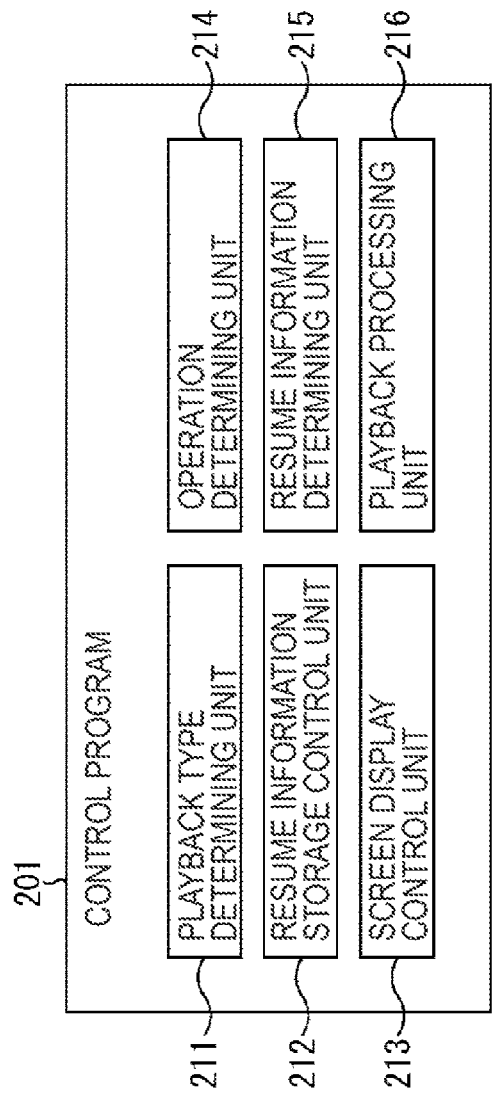
FIG. 3 is a block diagram illustrating the configuration of a control program executed by a CPU.

The first determining means of the playback apparatus determines whether a user carried out an operation for start playing back the image data when the image data is not being played back, and the playback apparatus further includes a second determining means (for example, the resume information determining unit 215 illustrated in FIG. 3) for determining whether the icon is superposed on the thumbnail image corresponding to the image data being played back when the first determining means determines that an operation for start playing back the image data is carried out by the user, and playback control means (for example, the playback processing unit 216 illustrated in FIG. 3) for controlling the playback of the image data on the basis of the first set of information so that the image data is played back from the position where the playback of the image data was stopped when the second determining means determines that the icon is superposed on the thumbnail image.

The playback apparatus further includes third determining means (for example, the playback type determining unit 211 illustrated in FIG. 3) for determining the type (for example, the playback type) of the image data, wherein the type of the image data being one of moving image, still image, and play list, the play list being used for selecting moving images or still images and for playing back the selected images in a predetermined order, wherein the storage control means controls the storage process so that the type of the image data based on the determination results of the third determining means is stored as a second set of information (for example, the playback type) and controls the storage process so that, when the image data is being played back, the first set of information is stored by the type of the image data when the first determining means determines that the user carried out an operation for stopping the image data from being played back, and wherein the display control means controls the display of a screen so that a screen displaying a list of thumbnail images with the icon being superposed on a thumbnail image corresponding to the image data stopped from being played back is displayed on the basis of the first set of information and the second set of information.

The display control means of the playback apparatus controls the display of a screen so that a screen displaying a list of thumbnail images with each of the types of image data is displayed.

The playback control means of the playback apparatus controls the playback of the image data so that the image data is played back from the beginning when the second determining means determines that an icon is not superposed on a thumbnail image.

According to an embodiment of the present invention a method for playing back image data is provided. The method includes the steps of determining whether a user carried out an operation for stop playing back the image data when the image data is being played back (for example, Step S157 of the process illustrated in FIG. 11), controlling a storage process so that a first set of information indicating a position where the playback of the image data was stopped is stored when the first determining means determines that the user carried out an operation for stop playing back the image data (for example, Step S158 of the process illustrated in FIG. 11), and controlling the display of a screen so that a screen displaying a list of thumbnail images with an icon superposed on a thumbnail image corresponding to the image data stopped from being played back is displayed on the basis of the first set of information when the first determining means determines that the user carried out an operation for stop playing back the image data (for example, Step S159 of the process illustrated in FIG. 11), wherein the icon indicating that playback of the image data is resumed from the position where the playback of the image data was stopped.

According to an embodiment of the present invention a recording medium is provided. The program includes the steps of determining whether a user carried out an operation for stop playing back the image data when the image data is being played back (for example, Step S157 of the process illustrated in FIG. 11), controlling a storage process so that a first set of information indicating a position where the playback of the image data was stopped is stored when the first determining means determines that the user carried out an operation for stop playing back the image data (for example, Step S158 of the process illustrated in FIG. 11), and controlling the display of a screen so that a screen displaying a list of thumbnail images with an icon superposed on a thumbnail image corresponding to the image data stopped from being played back is displayed on the basis of the first set of information when the first determining means determines that the user carried out an operation for stop playing back the image data (for example, Step S159 of the process illustrated in FIG. 11), wherein the icon indicating that playback of the image data is resumed from the position where the playback of the image data was stopped.

Figure 2:
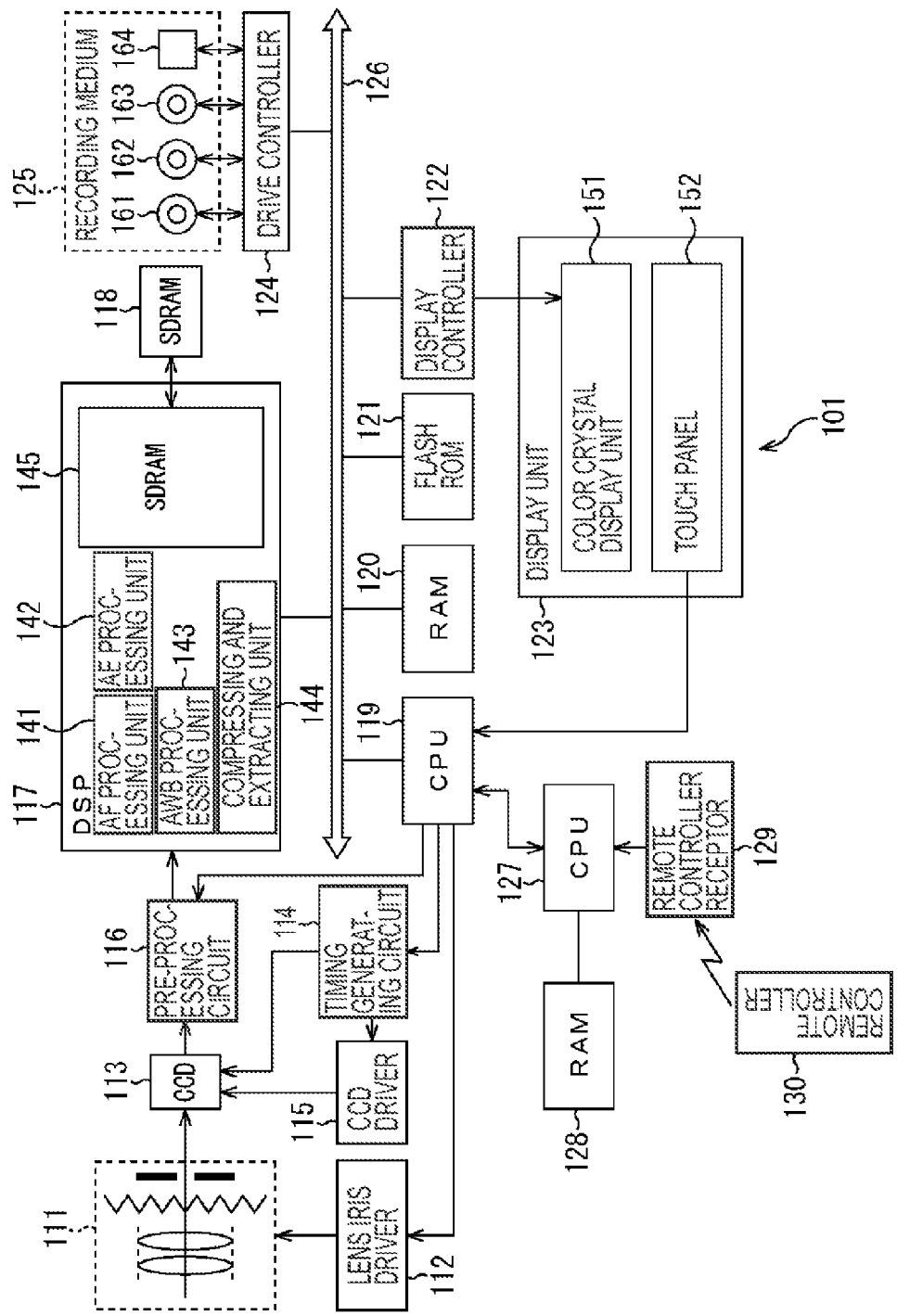
FIG. 2 is a block diagram of a digital video camera according to an embodiment of the present invention.

The program can be stored in a recording medium (for example, the optical disk 162 illustrated in FIG. 2).

Embodiments of the present invention will now be described with reference to the drawings.

FIG. 2 is a block diagram illustrating the structure of a digital video camera 101 according to an embodiment of the present invention.

The digital video camera 101 is a playback apparatus that is configured to drive an optical disk.

The description below is based on the digital video camera 101. However, embodiments of the present invention are not limited, and according to an embodiment of present invention, a digital still camera, a mobile phone with an image pick-up function, or a personal computer with image pick-up function may be provided.

An optical block 111 includes, for example, optical lenses, a focusing mechanism, a shutter mechanism, and an iris mechanism. The optical block 111 focuses light reflected from an object to form an image of the object on a reception unit of the charge coupled device (CCD) 113. The optical block 111 is driven by a lens iris driver 112.

The lens iris driver 112 operates the optical block 111 by sending a driving signal to the optical block 111 so as to operate the optical block 111 in accordance with the control by a central processing unit (CPU) 119. For example, when capturing an image, the lens iris driver 112 supplies a driving signal for focusing light and adjusting the iris to control the amount of entering light on the basis of an instruction from the user to the optical block 111.

The CCD 113 includes a CCD sensor and converts light into an analog electric signal by carrying out photoelectric transfer of the image formed by the optical block 111 in accordance with the driving signal sent from a CCD driver 115. The CCD 113 sends image data as an analog signal to a pre-processing circuit 116 on the basis of a timing signal sent from a timing generating circuit 114 controlled by the CPU 119.

The CCD 113 is not limited to a CCD sensor and may be any image pick-up device, such as a complementary metal oxide semiconductor (CMOS), capable of generating an image signal in pixel units.

The timing generating signal 114 generates a timing signal that functions as a timing reference for the operation of the CCD 113 on the basis of the control by the CPU 119 and sends the generated timing signal to the CCD 113 and the CCD driver 115.

The CCD driver 115 generates a driving signal for driving the CCD 113 on the basis of the timing signal received from the timing generating circuit 114 and sends the generated driving signal to the CCD 113.

The pre-processing circuit 116 carries out correlated double sampling (CDS) on the image data sent as an analog signal from the CCD 113 so as to maintain a suitable signal/noise (S/N) ratio and carries out automatic gain control (AGC) so as to control the gain. Then, the pre-processing circuit 116 carries out analog/digital (A/D) conversion so as to convert analog signals into digital signals and sends the image data as a digital signal to a digital signal processor (DSP) 117.

The DSP 117, for example, includes a specialized DSP or a multi-purpose DSP, which are specialized integrated circuits (ICs).

The DSP 117 carries out image processing on the image data sent as a digital signal from the pre-processing circuit 116. The DSP 117 includes, for example, an automatic focus (AF) processing unit 141, an automatic exposure (AE) processing unit 142, an automatic white balance (AWB) processing unit 143, and a compressing/extracting unit 144. The DSP 117 employs predetermined camera signal processing to process the image data sent from the pre-processing circuit 116 and compresses the image data, which is adjusted in various ways according to a predetermined compression method, by the predetermined camera signal processing. Moreover, the DSP 117 includes a synchronous dynamic random access memory (SDRAM) controller 145.

The DSP 117 sends the compressed image data via a bus 126 the drive controller 124 on the basis of the control of the CPU 119 and stores the image data as a file on a recording medium 125.

When predetermined image data is read out from the recording medium 125 in accordance with an input operation carried out by a user via a touch panel 152 and a control key (not shown), the compressed image data received from the recording medium 125 via the bus 126 is extended by the DSP 117 through a predetermined extraction process (decompression process) in accordance with the compressed image data. Then, the extended image data is sent to a display controller 122 via the bus 126.

The AF processing unit 141 carries out a process for bringing an object into focus (i.e., automatic focusing) on the image data stored in a SDRAM 118 sent from the pre-processing circuit 116. The AE processing unit 142 also carries out a process for determining the exposure on the basis of the brightness of the object (i.e., automatic exposure). The AWB processing unit 143 carries out a process for correcting the entire image data on the basis of a predetermined reference color (white) (i.e., white balance).

The compressing/extracting unit 144 compresses the image data, which is adjusted in various ways according to a predetermined compression method, by a predetermined camera signal process. For example, the compressing/extracting unit 144 compresses image data in accordance with a joint photographic experts group (JPEG) format. In this way, the amount of the image data can be reduced before storing the image data on the recording medium 125.

When image data is read out from the recording medium 125, the compressed image data received from the recording medium 125 via the bus 126 is extended by the compressing/extracting unit 144 through a predetermined extraction process (decompression process) in accordance with the compressed image data. Then, the extended image data is sent to a display controller 122 via the bus 126.

The SDRAM controller 145 controls the SDRAM 118 on the basis of programs and various data used by the DSP 117 so as to temporarily store these programs and data in the SDRAM 118.

The SDRAM 118 stores the programs and various data used by the DSP 117 on the basis of the control of the SDRAM controller 145. For example, by temporarily storing image data sent from the pre-processing circuit 116 in the SDRAM 118, the DSP 117 can generate compressed image data by carrying out predetermined camera signal processing and image data compression processing on the temporarily stored image data. The compressed image data is read out from the SDRAM 118 and is sent to a drive controller 124 via the bus 126.

The CPU 119 controls various units of the digital video camera 101, such as the lens iris driver 112, the timing generating circuit 114, and the DSP 117. For example, to capture an image, the CPU 119 operates the optical block 111 by controlling the lens iris driver 112 so as to generate a driving signal for operating the optical block 111 and supplying the generated driving signal to the optical block 111.

The CPU 119 carries out various processes in accordance with programs stored in a flash read only memory (ROM) 121 and a random access memory (RAM) 120. For example, the CPU 119 carries out various processes in accordance with control programs (for example, a control program 201 described below) stored in the flash ROM 121.

The RAM 120 stores programs and various data used by the CPU 119. The flash ROM 121 records these programs and various data used by the CPU 119. The CPU 119, the RAM 120, and the flash ROM 121 are mutually connected via the bus 126.

The bus 126 is also connected to the DSP 117, the display controller 122, and the drive controller 124.

The display controller 122 generates an image signal to be sent to a display unit 123 based on the image data sent from the DSP 117 and sends the generated image signal to the display unit 123. The display controller 122 controls the image displayed on the display unit 123 by sending image signals to the display unit 123.

The display unit 123 displays an image that is based on the image signal sent from the display controller 122 on the display screen.

The display mode of the image conforms to the control program (for example, the control program 201 described below) recorded in the flash ROM 121. In other words, the display controller 122 determines the display mode for displaying an image on the screen of the display unit 123.

The display unit 123 includes a color liquid crystal display unit 151 and the touch panel 152.

The color liquid crystal display unit 151 includes, for example, a liquid crystal display (LCD) and displays an image in accordance with an image signal from the display controller 122. In this way, an image in accordance with image data stored in, for example, the recording medium 125 is displayed on the screen of the color liquid crystal display unit 151.

The touch panel 152 displayed on the color liquid crystal display unit 151 is transparent and the screen of the color liquid crystal display unit 151 can be seen through the touch panel 152. The touch panel 152 allows a user to select keys on the operation screen displayed on the color liquid crystal display unit 151 and sends a signal including information on the position of operated key to the CPU 119.

The drive controller 124 includes a predetermined interface corresponding to the recording medium 125. The drive controller 124 records the image data sent from the DSP 117 on the recording medium 125 or reads out image data recorded on the recording medium 125 and sends the readout image data to the DSP 117 or the CPU 119. For example, if the recording medium 125 is an optical disk 162, the drive controller 124 includes a predetermined interface in accordance with the optical disk 162 and stores the image data sent from the DSP 117 on the optical disk 162.

The recording medium 125 is detachable and includes, for example, a magnetic disk 161 (for example a hard disk (HDD)), the optical disk 162 (for example a recordable compact disk (CD) or a recordable digital versatile disk (DVD)), a magneto-optical disk 163 (for example, a MiniDisk (MD) (registered trademark of Sony Corporation)), or a semiconductor memory 164 (for example, a memory card).

A CPU 127 stores resume information sent from the CPU 119 or sends the resume information stored in a RAM 128 to the CPU 119. In other words, the CPU 119 transmits and receives data between the laser source 127 and the RAM 128. The CPU 127 sends a signal (operation signal) sent from a remote controller receptor 129 to the CPU 119. The CPU 127 and the CPU 119 may be provided as a single CPU.

Resume information is information including the playback type and the resume point of an image. For example, resume information may correspond to a moving image, a still image, or a play list. For a moving image, the playback type information stored in the RAM 128 corresponds to a moving image. For a still image, the playback type stored in the RAM 128 corresponds to a still image. For a play list, the playback type stored in the RAM 128 corresponds to a play list. The play list allows moving images and still images to be selected and played back in a predetermined order. A resume point is information corresponding to the subsequent playback-start point on the optical disk 162. Each resume point is stored for each playback type in the RAM 128 as the time from the first playback point on the optical disk 162 to the subsequent playback-start point. However, resume points are not limited to time data.

The RAM 128 includes, for example, a nonvolatile memory, such as a flash memory or an electronically erasable or programmable read only memory (EEPROM) and stores various data, such as resume information, utilized by the CPU 119.

The remote controller receptor 129 receives a control signal sent from a remote controller 130 on the basis of an operation carried out by the user and sends a signal (operation signal) corresponding to the received control signal to the CPU 119 via the CPU 127.

The remote controller 130 generates a control signal and sends the generated control signal to the digital video camera 101 on the basis of an operation carried out by the user.

FIG. 3 is a block diagram illustrating the structure of the control program 201 executed by the CPU 119.

The control program 201 is stored, for example, in the flash ROM 121. The control program 201 is sent to the RAM 120 from the flash ROM 121 and is executed by the CPU 119. For example, the control program 201 carries out a control process for resume playback of a moving image, a still image, or a play list on the basis of the playback type information sent from a playback type determining unit 211.

The playback type determining unit 211 determines whether the playback type information corresponds to a moving image, a still image, or a play list, on the basis of the operation carried out by the user. The result of the determination process is sent from the playback type determining unit 211 to a resume information storage control unit 212.

For example, the playback type determining unit 211 determines that the playback type information corresponds to a moving image if the user carries out an operation for ejecting the optical disk 162 from the drive (not shown), recording a moving image, or displaying an operation screen (hereinafter referred to as a "visual index screen") when a moving image tab (for example, a moving image tab 306 described below) is selected. Then, the playback type determining unit 211 sends the playback type information corresponding to a moving image to the resume information storage control unit 212.

For example, the playback type determining unit 211 determines that the playback type information corresponds to a still image if the user carries out an operation for recording a still image or displaying a visual index screen when a still image tab (for example, a still image tab 307 described below) is selected. Then, the playback type determining unit 211 sends the playback type information corresponding to a still image to the resume information storage control unit 212.

For example, the playback type determining unit 211 determined that the playback type information corresponds to a play list if the visual index screen is displayed when a play list tab (for example, a play list tab 308 described below) is selected. Then, the playback type determining unit 211 sends the playback type information corresponding to a play list to the resume information storage control unit 212.

The playback type determining unit 211 obtains the playback type information stored in the RAM 128 and determines whether the obtained playback type information corresponds to a moving image, a still image, or a play list. As a result of the determination process, the playback type determining unit 211 sends the playback type information to the control program 201.

For example, if the playback type information stored in the RAM 128 corresponds to a moving image, the playback type determining unit 211 determines that the playback type information corresponds to a moving image on the basis of the obtained playback type information and sends the result indicating that the playback type information corresponds to a moving image to the control program 201.

The resume information storage control unit 212 stores the playback type information in the RAM 128 on the basis of the playback type information sent from the playback type determining unit 211.

For example, if the playback type information originally stored in the RAM 128 corresponds to a still image, the resume information storage control unit 212 changes the playback type information from that corresponding to a still image to that corresponding to a moving image since playback type information corresponding to a moving image is sent from the playback type determining unit 211 and stores this playback type information in the RAM 128.

The resume information storage control unit 212 stores a resume point, which is subsequent playback-start point, in the RAM 128. The resume point is generated on the basis of the image data recorded on the optical disk 162 loaded in the digital video camera 101 and a signal sent from the touch panel 152.

A resume point is information corresponding to the subsequent playback-start point of the optical disk 162. A resume point is stored in the RAM 128 for each playback type as the time from the first playback point on the optical disk 162 to the subsequent playback-start point. However, resume points are not limited to time data.

If a STOP key (for example, a STOP key 401 described below) is touched by the user while a chapter of a moving image is being played back, for example, at time ta, the resume information storage control unit 212 stores, the RAM 128, a resume point representing the time ta that corresponds to a point in the middle of a chapter of the moving image and being based on the image data of the moving image stored on the optical disk 162 loaded in the digital video camera 101 and a signal sent from the touch panel 152.

If the STOP key (not shown) is touched by the user while a chapter of a still image is being played back, the resume information storage control unit 212 stores, in the RAM 128, a resume point representing the chapter and being based on the image data of the still image stored on the optical disk 162 loaded in the digital video camera 101 and a signal sent from the touch panel 152.

The resume information storage control unit 212 deletes the resume point stored in the RAM 128 on the basis of the image data stored on the optical disk 162 loaded in the digital video camera 101.

More specifically, in case a moving image is played back to the end, the resume information storage control unit 212 does not have to carry out resume playback of the image data since, the next time the image data is played back, the image data will be played from a playback point at the beginning of the optical disk 162. Therefore, the resume point stored in the RAM 128 is deleted.

For example, the resume information storage control unit 212 deletes the resume point representing the time to that corresponds to a point in the middle of a chapter of the moving image stored in the RAM 128.

The screen display control unit 213 displays a visual index screen for the moving image tab on the color liquid crystal display unit 151 and displays, in thumbnail display areas, thumbnail images based on the image data recorded on the optical disk 162 loaded in the digital video camera 101 and resume information (i.e., information on playback type and resume point) stored in the RAM 128. The screen display control unit 213 superposes a resume icon on a predetermined thumbnail image displayed in a thumbnail display area.

For example, the screen display control unit 213 displays thumbnail images in thumbnail display areas on the basis of the image data of a moving image recorded on the optical disk 162 loaded in the digital video camera 101, the playback type information corresponding to a moving image stored in the RAM 128, and a resume point indicating the time to that corresponds to a point in the middle of a chapter of the moving image. By displaying a resume icon (for example, a resume icon 302 described below) on one of the thumbnail images displayed in the thumbnail display areas, a visual index screen for the moving image tab is displayed on the color liquid crystal display unit 151.

For example, the screen display control unit 213 displays thumbnail images in the thumbnail display area on the basis of the image data of still images recorded on the optical disk 162 loaded in the digital video camera 101, the playback type information corresponding to a still image stored in the RAM 128, and a resume point indicating a point in the chapter being played back. By displaying a resume icon (for example, the resume icon 322 described below) on one of the thumbnail images displayed in the thumbnail display areas, the visual index screen for the still image tab is displayed on the color liquid crystal display unit 151.

For example, the operation determining unit 214 determines whether the user touched a thumbnail image displayed in the thumbnail display areas of the visual index screen for the moving image tab (i.e., whether the user pressed the touch panel 152) on the basis of a signal from the touch panel 152. For example, the operation determining unit 214 determines whether the user touched a STOP key (for example, the STOP key 401 described below) displayed on a playback screen for displaying played back moving image (i.e., whether the user pressed the touch panel 152) on the basis of a signal from the touch panel 152.

The operation determining unit 214 determines whether the user operated the remote controller 130 on the basis of a signal sent from the remote controller receptor 129.

For example, the operation determining unit 214 determines whether the user pressed a PLAY key (for example a PLAY key 259 described below) of the remote controller 130 on the basis of a signal sent from the remote controller receptor 129.

The operation determining unit 214 determines whether the user carried out an operation for displaying a visual index screen on the basis of a signal from the touch panel 152.

For example, if the user selects the moving image tab, the still image tab, or the play list tab of the visual index screen, the operation determining unit 214 determines that a process for displaying one of the visual index screens is carried out on the basis of a signal from the touch panel 152.

A resume information determining unit 215 determines whether a resume icon is superposed on the thumbnail image displayed in the thumbnail display area that was touched by the user. The resume information determining unit 215 may instead determine whether a resume point representing a specific time and being stored in the RAM 128 corresponds to a specific moment in the playback time of the image data corresponding to a thumbnail image.

For example, the resume information determining unit 215 determines whether a resume icon (for example, the resume icon 302 described below) is superposed on a thumbnail image displayed in the thumbnail display area touched by the user on the visual index screen for the moving image tab.

A playback processing unit 216 resumes playback of the moving image from the time (point) when the playback of the moving image was stopped in the last operation on the basis of the image data of the moving image stored on the optical disk 162 loaded in the digital video camera 101 and the resume point stored in the RAM 128.

For example, the playback processing unit 216 resume playback of the moving image at time ta that represents the time the moving image was stopped in the last operation on the basis of the image data of the moving image and the resume point indicating time ta that represent a point in the middle of a chapter of the moving image stored in the RAM 128. In other words, the playback of the moving image is started from time ta that represents a point in the middle of a chapter of the moving image.

The playback processing unit 216 resumes playback of the moving image from the beginning of the chapter corresponding to the thumbnail image displayed in the thumbnail display area touched by the user on the basis of the image data of the moving image stored on the optical disk 162 loaded in the digital video camera 101.

The playback processing unit 216 resumes playback of the still images from the time (point) when the playback of the still images was stopped in the last operation on the basis of the image data of the still images stored on the optical disk 162 loaded in the digital video camera 101 and the resume point stored in the RAM 128.

For example, the playback processing unit 216 resumes playback of the still images from the chapter at which the playback of the still images was stopped in the last operation on the basis of the image data of the still images and the resume point, stored in the RAM 128, representing a chapter in the still images being played back.

The playback processing unit 216 plays back a still image corresponding to a thumbnail image displayed in the thumbnail display area touched by the user.

Figure 4:
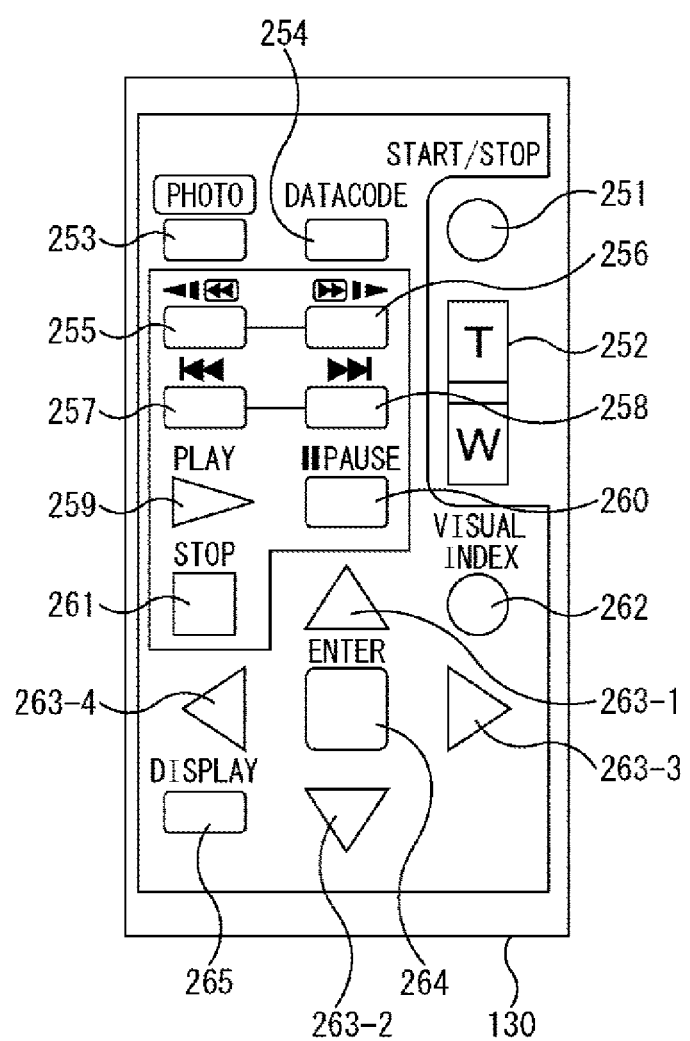
FIG. 4 is an exemplary schematic view of the exterior of a remote controller.

FIG. 4 illustrates an exemplary schematic view of the exterior of the remote controller 130. A START/STOP key 251 provided on the remote controller 130 is operated so as to indicate the starting and stopping of image capturing in a moving image capturing mode and to indicate the timing for capturing an image in a still image mode. A ZOOM key 252 is operated to carry out a zoom-in operation or a zoom-out operation. A PHOTO key 253 is operated to switch from the moving image capturing mode to the still image capturing mode. A DATA CODE key 254 is operated to display, for example, the data of capturing an image or information on various units of the digital video camera 101.

A BACKWARD DIRECTION SCAN key 255 is operated to scan an image in a backward direction or play an image at a slow speed. A FORWARD DIRECTION SCAN key 256 is operated to scan an image in a forward direction or play an image at a slow speed.

A PREVIOUS key 257 is operated to carry out cueing in the backward direction. A NEXT key 258 is operated to carry out cueing in the forward direction. A PLAY key 259 is operated to play the selected moving image or still image. A PAUSE key 260 is operated to pause the playing back of a moving image. A STOP key 261 is operated to stop playing back a moving image. A VISUAL INDEX key 262 is operated to display a visual index screen.

MOVE keys 263-1 to 263-4 are operated to move a selected position (i.e., position of a highlighted area) in vertical and horizontal directions on the operation screen. An ENTER key 264 is operated to finalize the area selected by the MOVE keys 263-1 to 263-4. A DISPLAY key 265 is operated to change the display on the color liquid crystal display unit 151.

Next, details of playback type information are described with reference to FIGS. 5 and 6. As described above, playback type information corresponds to, for example, moving image, still image, or play list.

Figure 5:
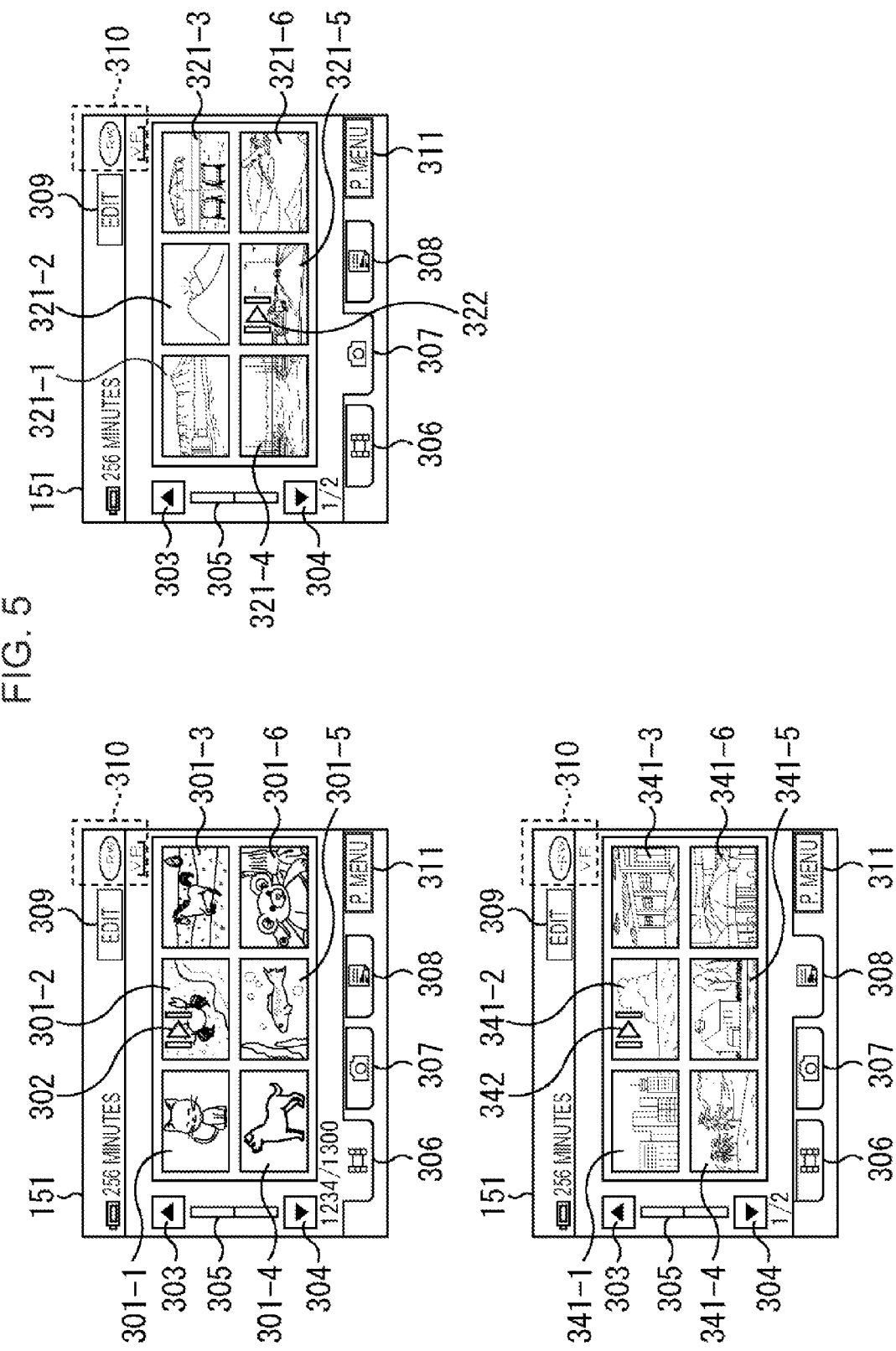
FIG. 5 illustrates an exemplary screen of a color liquid crystal display unit of a digital video camera displaying an operation screen.
Figure 6:
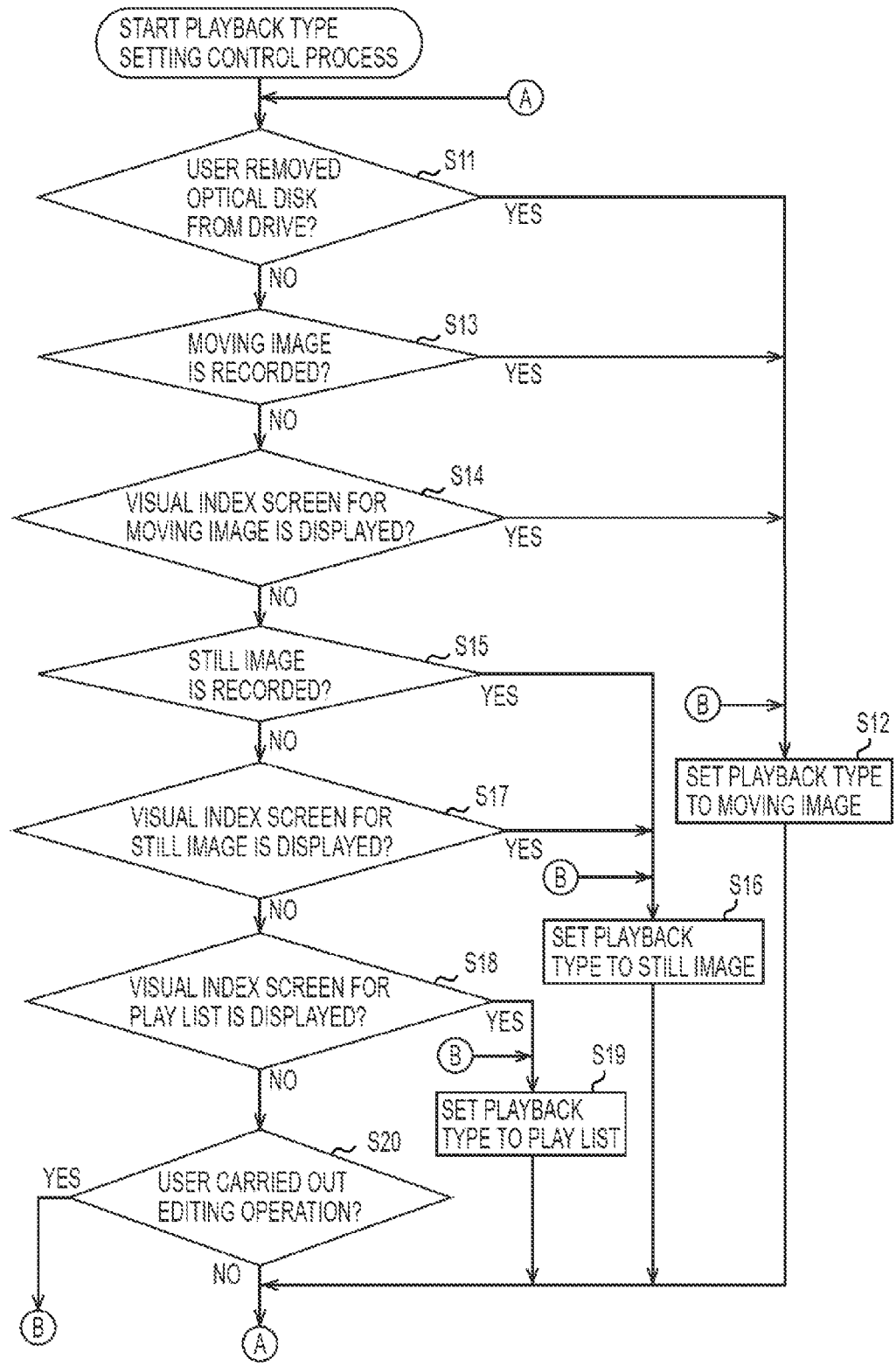
FIG. 6 is a flow chart illustrating a control process for setting playback type.

With reference to FIG. 5, an exemplary operation screen (visual index screen) on the color liquid crystal display unit 151 of the digital video camera 101 will be described.

The upper left area in FIG. 5 shows an exemplary operation screen displayed when the moving image tab 306 is selected (hereinafter referred to as a "visual index screen for moving images"). The upper right area of FIG. 5 shows an exemplary operation screen displayed when the still image tab 307 is selected (hereinafter referred to as a "visual index screen for still images"). The lower left area of FIG. 5 shows an exemplary operation screen displayed when the play list tab 308 is selected (hereinafter referred to as a "visual index screen of a play list").

The digital video camera 101 records chapters, which each corresponds to an image captured between a recording-start operation and a recording-stop operation, and displays thumbnail images corresponding to the chapters. In this way, the user can select a thumbnail image displayed on a visual index screen to play back any recorded image. More specifically, the image data recorded on the optical disk 162 can be intuitively recognized by the user by displaying a list of thumbnail images corresponding to the chapters on a visual index screen whereas the image data may not be so easily recognizable by the user if a list of text, such as recording dates, is provided.

First, the visual index screen for moving images will be described with reference to the screen shown in the upper left area in FIG. 5.

In the visual index screen for moving images shown in the upper left area of FIG. 5, thumbnail display areas 301-1 to 301-6 display thumbnail images corresponding to the image data stored on the optical disk 162 loaded in the digital video camera 101.

When one of the thumbnail images displayed in the thumbnail display areas 301-1, 301-3, 301-4, 301-5, and 301-6 is touched by the user (i.e., when the user touches the touch panel 152), a chapter of a moving image corresponding to the thumbnail image displayed in the thumbnail display area touched by user is played from the beginning.

When the resume icon 302 superposed on a thumbnail image displayed in the thumbnail display area 301-2 is touched by the user (i.e., when the user touches the touch panel 152), a chapter of a moving image corresponding to the thumbnail image displayed in the thumbnail display area 301-2 is played back from the point where the playback of the moving image was previously stopped (i.e., resume playback is carried out).

In this way, the user can look at the resume icon 302 superposed on a thumbnail image displayed in one of the thumbnail display areas 301-1 to 301-6 and intuitively recognize the position where the playback of the moving image was previously stopped.

An upward scroll button 303 is operated to carry out upward scroll of the thumbnail images displayed in the thumbnail display areas 301-1 to 301-6. To scroll the displayed thumbnail images, the user may first press one of the MOVE keys 263-1 to 263-4 of the remote controller 130 to move the highlighted area up to the upward scroll button 303 and then press the ENTER key 264 or may touch the upward scroll button 303 displayed on the color liquid crystal display unit 151 (i.e., press the touch panel 152). The other buttons described below are operated in the same manner as the upward scroll button 303.

A downward scroll button 304 is operated to carry out downward scroll of the thumbnail images displayed in the thumbnail display areas 301-1 to 301-6. A slide bar 305 slides when a thumbnail image displayed on the thumbnail display areas 301-1 to 301-6 is scrolled upward or downward.

The moving image tab 306 is used to display thumbnail images that correspond to the image data of moving images stored on the optical disk 162 loaded in the digital video camera 101 in the thumbnail display areas 301-1 to 301-6. The still image tab 307 is used to display thumbnail images that correspond to the image data of still images stored on the optical disk 162 loaded in the digital video camera 101 in the thumbnail display areas 321-1 to 321-6. The play list tab 308 is used to display a play list for playing back selected moving images or still images in a predetermined order in thumbnail display areas 341-1 to 341-6, as described below.

In other words, the user may select the moving image tab 306, the still image tab 307, or the play list tab 308 on the visual index screen. The visual index screen shown in the upper left area of FIG. 5 is a visual index screen for the moving image tab 306.

An edit button 309 is operated to by the user to, for example, delete an unwanted chapter or edit a play list by rearranging the order of the moving images and still images.

An optical disk information area 310 displays information on the optical disk 162 loaded in the digital video camera 101. For example, if a disk conforming to DVD Specifications for Re-recordable Disc (i.e., a DVD-RW) is loaded in the digital video camera 101, "-RW," which represents the type of the optical disk 162, and "VR," which represents the recording format of the optical disk 162, are displayed in the optical disk information area 310.

A menu button 311 is operated by the user to display a menu screen.

A highlighted area (not shown) on the visual index screen displayed on the color liquid crystal display unit 151 is provided to indicate the area being operated by the user with the remote controller 130. More specifically, when the user operates the MOVE keys 263-1 to 263-4 of the remote controller 130, a predetermined area (the last operated area or an initial position for the highlighted area) on the visual index screen is highlighted. Then, while the user continues to use the remote controller 130, the area being operated by the user on the visual index screen is highlighted. If the user operates the touch panel 152 or if the remote controller 130 is not operated for a predetermined amount of time, the highlighted area on the visual index screen is unhighlighted.

Next, with reference to the visual index screen shown in the upper right area of FIG. 5, the visual index screen for still images will be described. In the visual index screen for still images shown in the upper right area of FIG. 5, the same components as those of the visual index screen for moving images shown in upper left area of FIG. 5 are represented by the same reference numerals and descriptions thereof are omitted.

In the visual index screen for still images shown in the upper right area of FIG. 5, thumbnail images corresponding to image data stored on the optical disk 162 loaded in the digital video camera 101 are displayed in the thumbnail display areas 321-1 to 321-6.

If the users touches a thumbnail image displayed in one of the thumbnail display areas 321-1 to 321-6 (i.e., if the user touches the touch panel 152), a still image corresponding to the thumbnail image displayed in the touched thumbnail display area is played back.

When the user presses the PLAY key 259 of the remote controller 130, a resume icon 322 displayed as a superposed image on the thumbnail image displayed in the thumbnail display area 321-5 so as to indicate that playback of the still images is resumed from the still image corresponding to the thumbnail image displayed in the thumbnail display area 321-5.

In this way, the user can look at the resume icon 322 superposed on a thumbnail image displayed in one of the thumbnail display areas 321-1 to 321-6 and intuitively recognize the position where the playback of the moving image was previously stopped.

Next, with reference to the screen shown in the lower left area of FIG. 5, the visual index screen for a play list will be described. In the visual index screen for a play list shown in the lower left area of FIG. 5, the same components as those of the visual index screen for moving images shown in upper left area of FIG. 5 are represented by the same reference numerals and descriptions thereof are omitted.

In the visual index screen for a play list shown in the lower left area of FIG. 5, thumbnail images corresponding to the image data stored on the optical disk 162 loaded in the digital video camera 101 are displayed in thumbnail display areas 341-1 to 341-6.

If the user touches one of the thumbnail display areas 341-1 to 341-6 (i.e., if the user touches the touch panel 152) and the thumbnail image displayed in the thumbnail display area touched by the user corresponds to a chapter of a moving image, the moving image is played back from the beginning of the chapter corresponding to the thumbnail image displayed in the thumbnail display area touched by the user. If the user touches one of the thumbnail display areas 341-1 to 341-6 (i.e., touches the touch panel 152) and the thumbnail image displayed in the thumbnail display area touched by the user corresponds to a still image, still images are played back from the still image corresponding to the thumbnail image displayed in the thumbnail display area touched by the user (i.e., a slide show of still images is played back).

For a moving image, when a resume icon 342 superposed on a thumbnail image displayed in the thumbnail display area 341-2 is touched by the user (i.e., when the user touches the touch panel 152), a chapter of the moving image corresponding to the thumbnail image displayed in the thumbnail display area 341-2 is played back from the point where the playback of the moving image was previously stopped. For a still image, when the user presses the PLAY key 259 of the remote controller 130, still images are played back from the still image corresponding to the thumbnail image displayed in the thumbnail display area 341-2.

In this way, the user can look at the resume icon 342 superposed on a thumbnail image displayed in one of the thumbnail display areas 341-1 to 341-6 and intuitively recognize the position where the playback of the moving image was previously stopped.

Since the resume points corresponding to moving images, still images, and a play list are stored in the RAM 128, the moving images, the still images, and the play list can be resumed from their subsequent playback-start point. As a result, the operation of resume playback for the digital video camera 101 can be improved.

Next, a control process for setting the playback type will be described with reference to the flow chart in FIG. 6.

In Step S11, the playback type determining unit 211 determines whether the user has ejected the optical disk 162 from the drive. The playback type determining unit 211 sends the determination result to the resume information storage control unit 212.

In Step S11, if the playback type determining unit 211 determines that the optical disk 162 has been ejected, the process proceeds to Step S12. In Step S12, the resume information storage control unit 212 sets the playback type to moving image on the basis of the playback type information received from the playback type determining unit 211 and store the playback type information in the RAM 128.

For example, if the playback type information stored in the RAM 128 is set to still image, in Step S12, the resume information storage control unit 212 changes the playback type from still image to moving image on the basis of the playback type information corresponding to a moving image received from the playback type determining unit 211 and stores this playback type information in the RAM 128.

In Step S11, if the playback type determining unit 211 determines that the optical disk 162 has not been ejected, the process proceeds to Step S13. In Step S13, the playback type determining unit 211 determines whether a moving image has been recorded in accordance with an operation carried out by the user. The playback type determining unit 211 sends its determination result to the resume information storage control unit 212.

In Step S13, if the playback type determining unit 211 determines that a moving image has been recorded, the process proceeds to Step S12. In Step S12, the resume information storage control unit 212 sets the playback type to moving image on the basis of the playback type information received from the playback type determining unit 211 and stores this playback type information in the RAM 128.

For example, if the user operates the digital video camera 101 in a moving image capturing mode so as to capture an image of an object, in Step S12, the resume information storage control unit 212 sets the playback type to a moving image on the basis of the playback type information corresponding to a moving image received from the playback type determining unit 211 and stores this playback type information in the RAM 128.

In Step S13, if the playback type determining unit 211 determines that a moving image has not been recorded, the process proceeds to Step S14. In Step S14, the playback type determining unit 211 determines whether a visual index screen for moving images has been displayed. The playback type determining unit 211 sends its determination result to the resume information storage control unit 212.

In Step S14, if the playback type determining unit 211 determines that a visual index screen for moving images has been displayed, the process proceeds to Step S12. In Step S12, the resume information storage control unit 212 sets the playback type to moving image on the basis of the playback type information received from the playback type determining unit 211 and stores this playback type information in the RAM 128.

For example, if the user selects the moving image tab 306 to display the visual index screen for moving images, in Step S12, the resume information storage control unit 212 sets the playback type to moving image on the basis of the playback type information corresponding to a moving image received from the playback type determining unit 211 and stores this playback type information in the RAM 128.

In Step S14, if the playback type determining unit 211 determines that a visual index screen for moving images has not been displayed, the process proceeds to Step S15. In Step S15, the playback type determining unit 211 determines whether a still image has been recorded in accordance with an operation carried out by the user. The playback type determining unit 211 sends its determination result to the resume information storage control unit 212.

In Step S15, if the playback type determining unit 211 determines that a still image has been recorded, the process proceeds to Step S16. In Step S16, the resume information storage control unit 212 sets the playback type to still image on the basis of the playback type information received from the playback type determining unit 211 and stores this playback type information in the RAM 128.

For example, if the playback type information stored in the RAM 128 corresponds to a moving image, in Step S16, the resume information storage control unit 212 changes the playback type from moving image to still image on the basis of the playback type information corresponding to still images received from the playback type determining unit 211 and stores this playback type information in the RAM 128.

More specifically, for example, if the user operates the digital video camera 101 in a still image capturing mode so as to capture an image of an object, in Step S16, the resume information storage control unit 212 sets the playback type to still image on the basis of the playback type information corresponding to still images received from the playback type determining unit 211 and stores this playback type information in the RAM 128.

In Step S15, if the playback type determining unit 211 determines that a still image has not been recorded, the process proceeds to Step S17. In Step S17, the playback type determining unit 211 determines whether a visual index screen for still images has been displayed. The playback type determining unit 211 sends its determination result to the resume information storage control unit 212.

In Step S17, if the playback type determining unit 211 determines that a visual index screen for still images has been displayed, the process proceeds to Step S16. In Step S16, the resume information storage control unit 212 sets the playback type to still image on the basis of the playback type information received from the playback type determining unit 211 and stores this playback type information in the RAM 128.

For example, if the user selects the still image tab 307 to display a visual index screen for still images, in Step S16, the resume information storage control unit 212 sets the playback type to still image on the basis of the playback type information corresponding to still images received from the playback type determining unit 211 and stores this playback type information in the RAM 128.

In Step S17, if the playback type determining unit 211 determines that a visual index screen for still images has not been displayed, the process proceeds to Step S18. In Step S18, the playback type determining unit 211 determines whether a visual index screen for a play list has been displayed. The playback type determining unit 211 sends its determination result to the resume information storage control unit 212.

In Step S18, if the playback type determining unit 211 determines that a visual index screen for a play list has been displayed, the process proceeds to Step S19. In Step S19, the resume information storage control unit 212 sets the playback type to play list on the basis of the playback type information received from the playback type determining unit 211 and stores this playback type information in the RAM 128.

For example, if the playback type determining unit 211 determines that the playback type information stored in the RAM 128 corresponds to a moving image, in Step S19, the resume information storage control unit 212 sets the playback type to play list on the basis of the playback type information received from the playback type determining unit 211 and stores this playback type information in the RAM 128.

More specifically, for example, if the user selects the play list tab 308 to display a visual index screen for a play list, in Step S19, the resume information storage control unit 212 sets the playback type to play list on the basis of the playback type information corresponding to a play list received from the playback type determining unit 211 and stores this playback type information in the RAM 128.

In Step S18, if the playback type determining unit 211 determines that a visual index screen for a play list has not been displayed, the process proceeds to Step S20. In Step S20, the playback type determining unit 211 determines whether the user has carried out editing. The playback type determining unit 211 sends its result to the resume information storage control unit 212.

In Step 20, if the playback type determining unit 211 determines that editing has been carried out, one of Steps S12, S16, and S19 is carried out to set the corresponding playback type and stores the playback type information in the RAM 128.

For example, in Step S20, if the playback type determining unit 211 determines that the user has deleted a moving image or has carried out editing for dividing a moving image, the process proceeds to Step S12. In Step S12, the resume information storage control unit 212 sets the playback type to moving image on the basis of the playback type information received from the playback type determining unit 211 and stores this playback type information in the RAM 128.

In Step 20, if the playback type determining unit 211 determines that editing for deleting a still image has been carried out, the process proceeds to Step S16. In Step S16, the resume information storage control unit 212 sets the playback type to still image on the basis of the playback type information received from the playback type determining unit 211 and stores this playback type information in the RAM 128.

For example, in Step S20, if the playback type determining unit 211 determines that the user has added a moving image or a still image to the play list, has deleted the play list, or carried out editing to move a chapter within the play list or divide a chapter, the process proceeds to Step S19. In Step S19, the resume information storage control unit 212 sets the playback type to play list on the basis of the playback type information received from the playback type determining unit 211 and stores this playback type information in the RAM 128.

In Step S20, if the playback type determining unit 211 determines that editing has not been carried out, the process returns to Step S11 and the above-described steps are repeated.

A resume playback function for a moving image of the digital video camera 101 according to an embodiment of the present invention will be described with reference to FIGS. 7 to 9.

First, a playback-stop operation of the digital video camera 101 according to an embodiment of the present invention will be described with reference to FIG. 7. The components illustrated in FIG. 7 that are the same as those in FIG. 5 are represented by the same reference numeral and the descriptions thereof are omitted.

Figure 7:
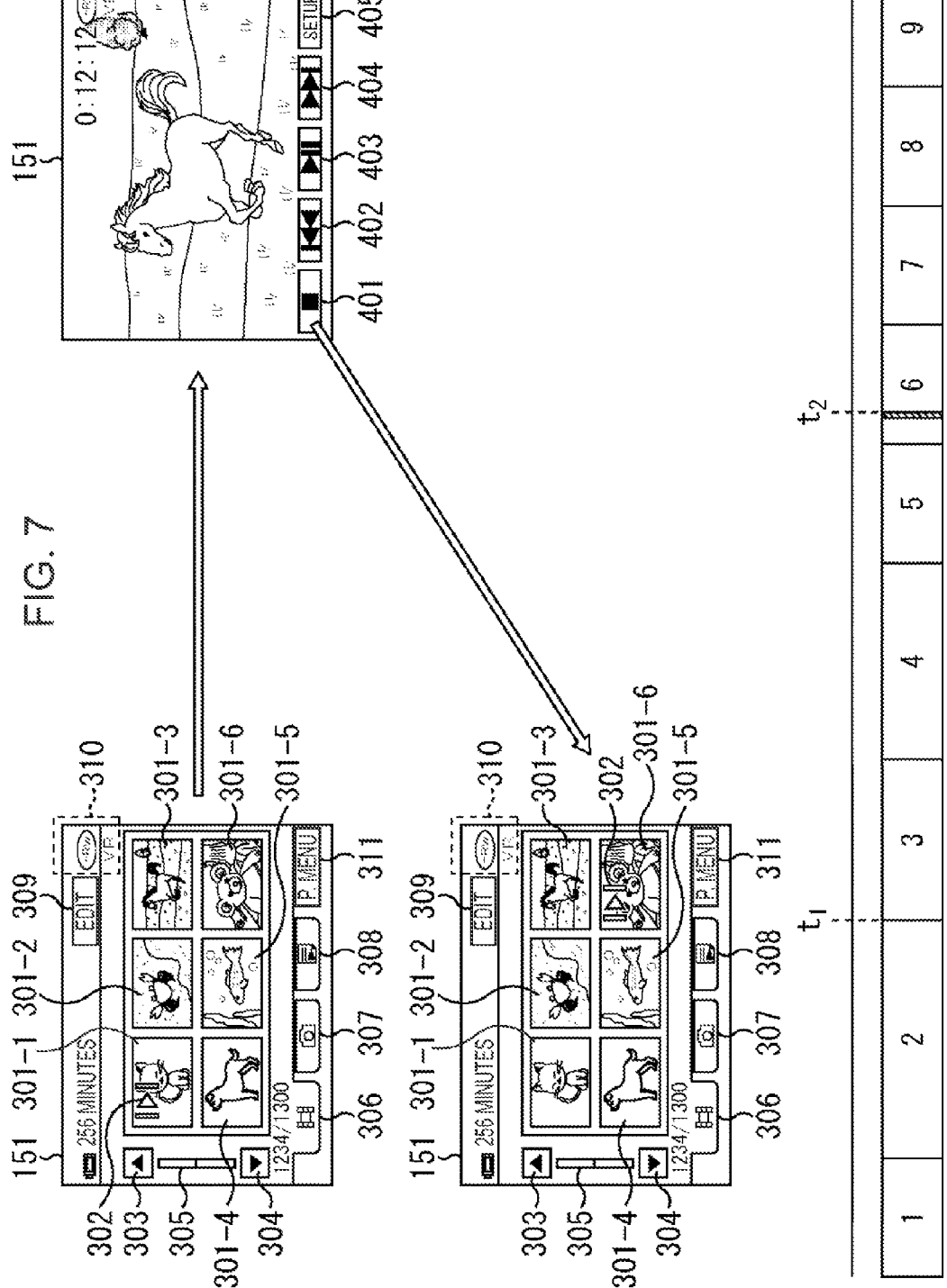
FIG. 7 illustrates the playback-stop operation of a digital video camera according to an embodiment of the present invention.

The upper left area in FIG. 7 illustrates an operation screen (visual index screen) displayed on the color liquid crystal display unit 151 of the digital video camera 101, and the upper right area in FIG. 7 illustrates a screen playing back a moving image (hereinafter referred to as a "playback screen").

The boxes in the lower area of FIG. 7 represent chapters of a moving image captured by the digital video camera 101, aligned time-sequentially. More specifically, since the digital video camera 101 records chapters (clusters), which each corresponds to an image captured between a recording-start operation and a recording-stop operation, chapters 1, 2, 3, 4, 5, 6, 7, 8, and 9, which are represented as boxes in the lower area of FIG. 7, are aligned time-sequentially from the left to the right wherein the box at the left is the oldest image that has been captured. In other words, in this case, the user has repeated the recording-start operation and the recording-stop operation nine times.

The longer a box is the longer the capturing time of the chapter, whereas the shorter a box is the shorter the capturing time of the chapter.

In the visual index screen for moving images shown in the upper left area of FIG. 7, thumbnail images corresponding to the image data stored on the optical disk 162 loaded in the digital video camera 101 are displayed in the thumbnail display areas 301-1 to 301-6. The moving image tab 306 is selected, and the visual index screen for moving images is displayed.

The thumbnail images displayed in the thumbnail display areas 301-1 to 301-6 correspond to the chapters represented by the boxes shown in the lower area of FIG. 7. More specifically, the thumbnail image displayed in the thumbnail display area 301-1 corresponds to the chapter 1. The left side of the box representing the chapter 1 corresponds to the time recording was started and the right side of the box corresponds to the time recording was stopped. Similarly, the thumbnail images displayed in the thumbnail display areas 301-2 to 301-6 correspond to the chapters 2 to 6, respectively.

Although not shown in the drawing, the thumbnail images displayed in the thumbnail display areas 301-4 to 301-6 when the thumbnail images are scrolled upwards by the upward scroll button 303 correspond to the chapters 7 to 9, respectively.

Since the resume information for the visual index screen for moving images shown in the upper left area of FIG. 7 does not include information on the position where the playback of the moving image was stopped (i.e., a resume point), the moving image is played back from the beginning of the chapter 1 and the resume icon 302 is superposed on the thumbnail image displayed in the thumbnail display area 301-1.

In the visual index screen for moving images, if the user touches a thumbnail image displayed on the thumbnail display area 301-3 among the thumbnail images displayed in the thumbnail display areas 301-1 to 301-6 (i.e., when the user presses the touch panel 152), the moving image of the chapter corresponding to the thumbnail image displayed in the thumbnail display area 301-3 is played back (refer to the playback screen shown in the upper right area of FIG. 7). In other words, the playback of the moving image is started from time t1 that is the time corresponding to the time the recording of the chapter 3 was started.

The playback screen shown in the upper right area of FIG. 7 shows a moving image of the chapter 3 being played back from time t1. A STOP key 401 is operated to stop playing back the moving image. A PREVIOUS key 402 is operated to cue a moving image in the backward direction. A PLAY/PAUSE key 403 is operated to play back a selected moving image or to stop the moving image being played back. A NEXT key 404 is operated to cue a moving image in the forward direction. A SETUP key 405 is operated to configure settings.

If the user operates the STOP key 401 among the keys displayed on the playback screen shown in the upper right area in FIG. 7 (i.e., presses the touch panel 152) after the moving image is played back from time t1 to time t2 (i.e., from the chapter 3 to midway through the chapter 6), the moving image is stopped and the playback screen is returned to the visual index screen for moving images, as shown in the lower left area in FIG. 7.

At this time, the resume icon 302 is displayed on the thumbnail image displayed in the thumbnail display area 301-6 since the STOP key 401 was touched while the chapter 6 has been played back. The resume point corresponding to the moment the STOP key 401 was touched while the chapter 6 has been played back (i.e., at time t2) is shown in the drawing as an area with hatching in the box corresponding to the chapter 6. The resume information storage control unit 212 stores this resume point (for example, time t2) in the RAM 128.

If the user stops the playback (i.e., if the user touches the STOP key 401), the playback screen returns to the visual index screen for moving images, as shown in the lower left area in FIG. 7. In this way, the user can check the resume icon 302 superposed on one of the thumbnail display areas 301-1 to 301-6 to carry out resume playback of a moving image from where the moving image was stopped in the last operation.

Next, the resume playback function of the digital video camera 101 according to an embodiment of the present invention will be described with reference to FIG. 8.

Figure 8:
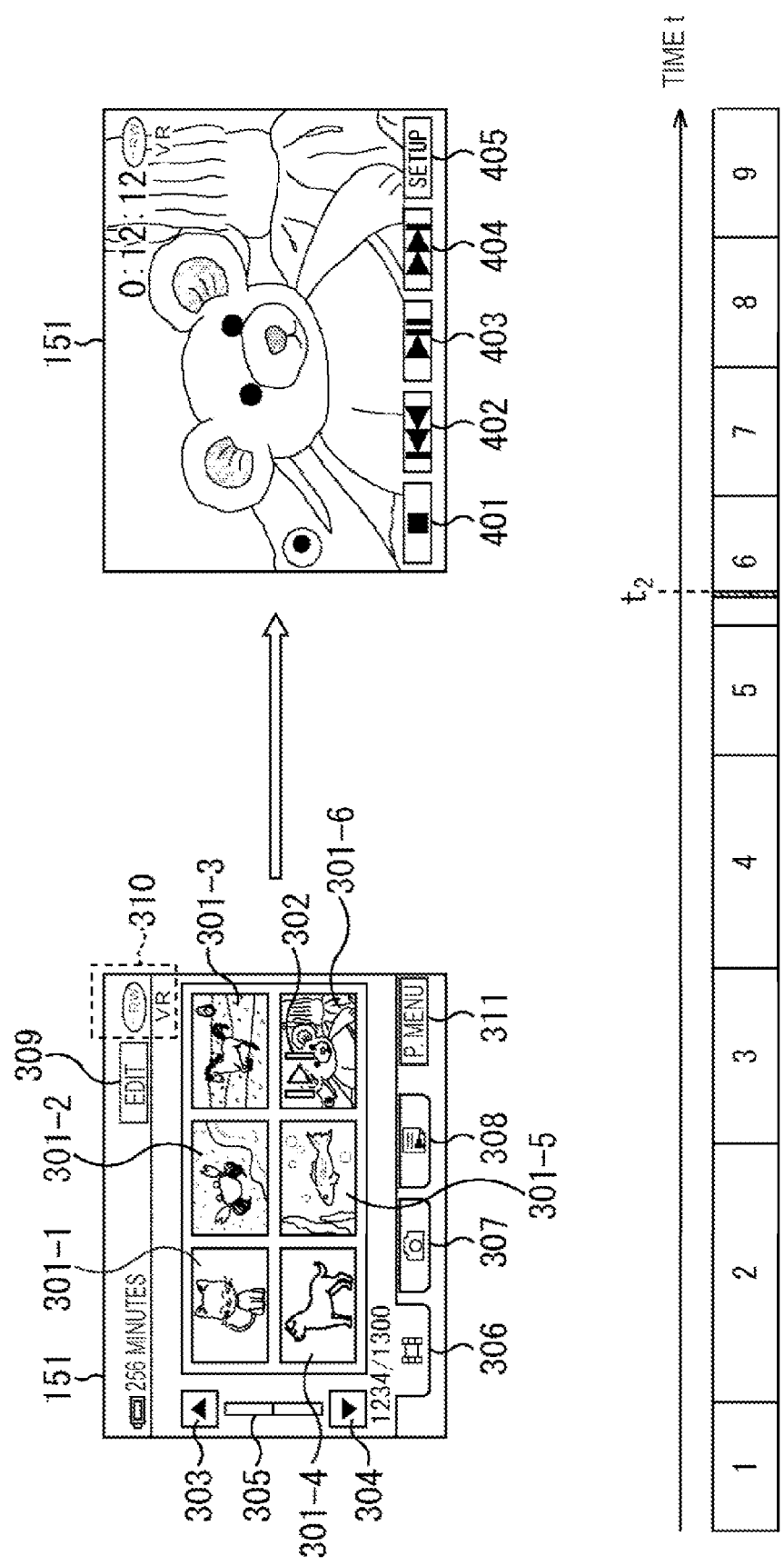
FIG. 8 illustrates a resume playback function of a digital video camera according to an embodiment of the present invention.

The upper left area in FIG. 8 illustrates a visual index screen displayed on the color liquid crystal display unit 151 of the digital video camera 101 according to an embodiment of the present invention, and the upper right area in FIG. 8 illustrates a playback screen. The boxes illustrated in the lower area in FIG. 8 time-sequentially represent chapters of a moving image captured by the digital video camera 101.

The same components as those of FIG. 7 are represented by the same reference numerals and descriptions thereof are omitted. More specifically, FIG. 8 illustrates the visual index screen of the digital video camera 101 according to an embodiment of the present invention at the moment (i.e., at time t2) when a stop operation has been carried out by the user by touching the STOP key 401 while the chapter 6 has been played back and illustrates a resume point as an area with hatching in the box corresponding to the chapter 6.

In the visual index screen for moving images, if the user touches a thumbnail image displayed on the thumbnail display area 301-6, where the resume icon 302 is superposed, among the thumbnail images displayed in the thumbnail display areas 301-1 to 301-6 (i.e., when the user presses the touch panel 152), the moving image of the chapter 6 corresponding to the thumbnail image displayed in the thumbnail display area 301-6, where the resume icon 302 is superposed, is played back from midway through the chapter 6. In other words, the playback of the moving image is started from time t2 that is the time corresponding to the time the playback of the chapter 6 was stopped.

In this way, the user can check the resume icon 302 superposed on a thumbnail images displayed in one of the thumbnail display areas 301-1 to 301-6 and intuitively recognize the position where the playback of the moving image was previously stopped.

Next, the playback function of the digital video camera 101 according to an embodiment of the present invention will be described with reference to FIG. 9.

Figure 9:
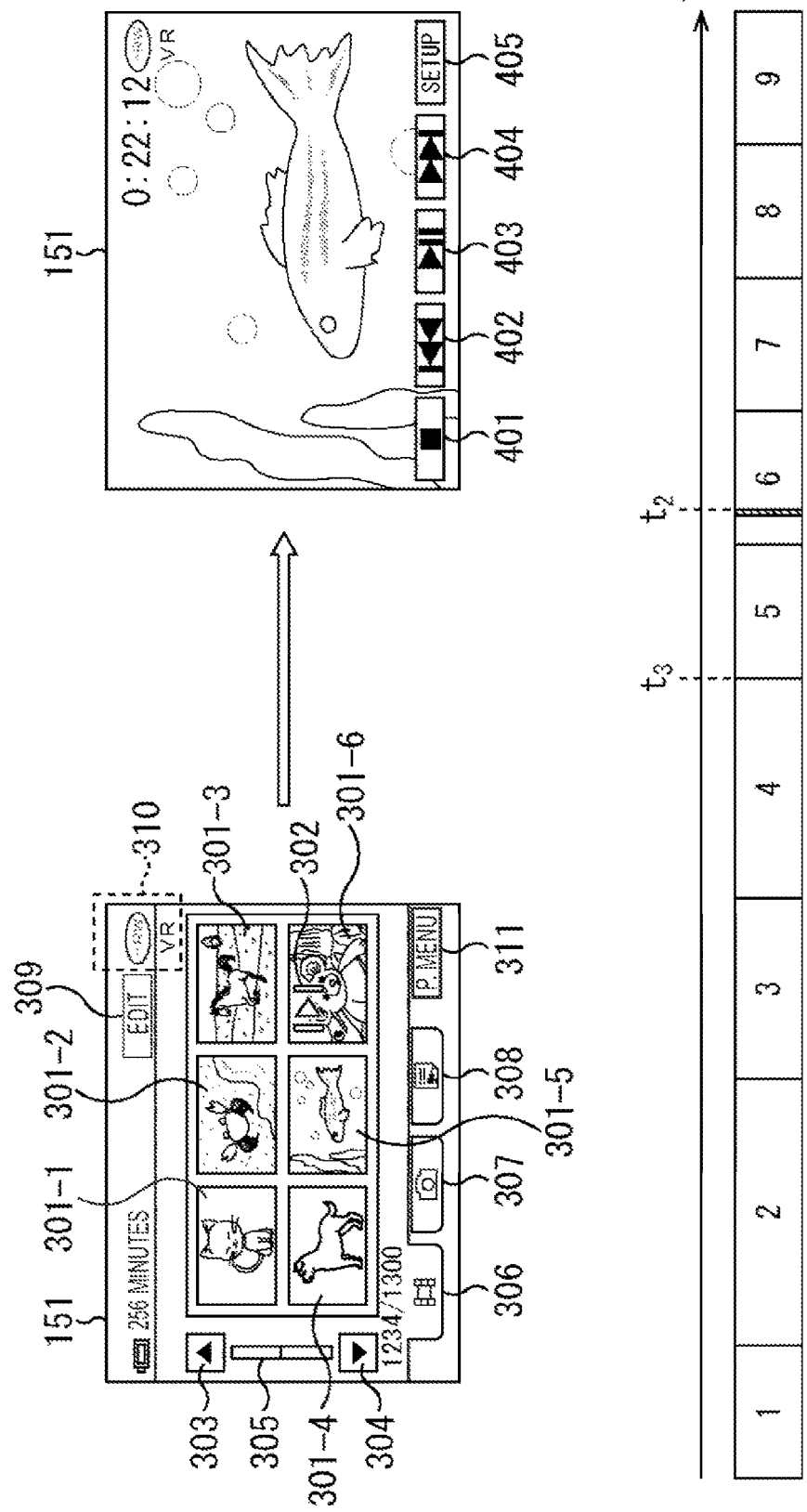
FIG. 9 illustrates a resume playback function of a digital video camera according to an embodiment of the present invention.

The upper left area in FIG. 9 illustrates a visual index screen displayed on the color liquid crystal display unit 151 of the digital video camera 101 according to an embodiment of the present invention and, the upper right area in FIG. 9 illustrates a playback screen. The boxes illustrated in the lower area in FIG. 9 time-sequentially represent chapters of a moving image captured by the digital video camera 101.

The same components as those of FIG. 7 are represented by the same reference numerals and descriptions thereof are omitted. More specifically, FIG. 9 illustrates the visual index screen of the digital video camera 101 according to an embodiment of the present invention at the moment (i.e., at time t2) when a stop operation has been carried out by the user by touching the STOP key 401 while the chapter 6 has been played back and illustrates a resume point as an area with hatching in the box corresponding to the chapter 6.

In the visual index screen for moving images, if the user touches a thumbnail image displayed on the thumbnail display area 301-5, where the resume icon 302 is not superposed, among the thumbnail images displayed in the thumbnail display areas 301-1 to 301-6 (i.e., when the user presses the touch panel 152), the moving image of the chapter 5 corresponding to the thumbnail image displayed in the thumbnail display area 301-5, where the resume icon 302 is not superposed, is played back from the beginning of the chapter 5. In other words, the playback of the moving image is started from time t3 that corresponding to the beginning of the chapter 5.

In other words, among the thumbnail images displayed in the thumbnail display areas 301-1 to 301-6, if the user touches a thumbnail image in thumbnail display areas where the resume icon 302 is not superposed (i.e., when the user presses the touch panel 152), the chapter of the moving image corresponding to the thumbnail image touched by the user is played back from the beginning.

The resume playback function for a moving image of the digital video camera 101 according to an embodiment of the present invention was described with reference to FIGS. 7 to 9. Moreover, the digital video camera 101 is capable to carrying out resume playback for still images and a play list in similar manners as that for moving images. Next, the resume playback function for moving images, still images, and a play list of the digital video camera 101 according to an embodiment of the present invention will be described with reference to the flow charts illustrated in FIGS. 10 to 13.

Figure 10:
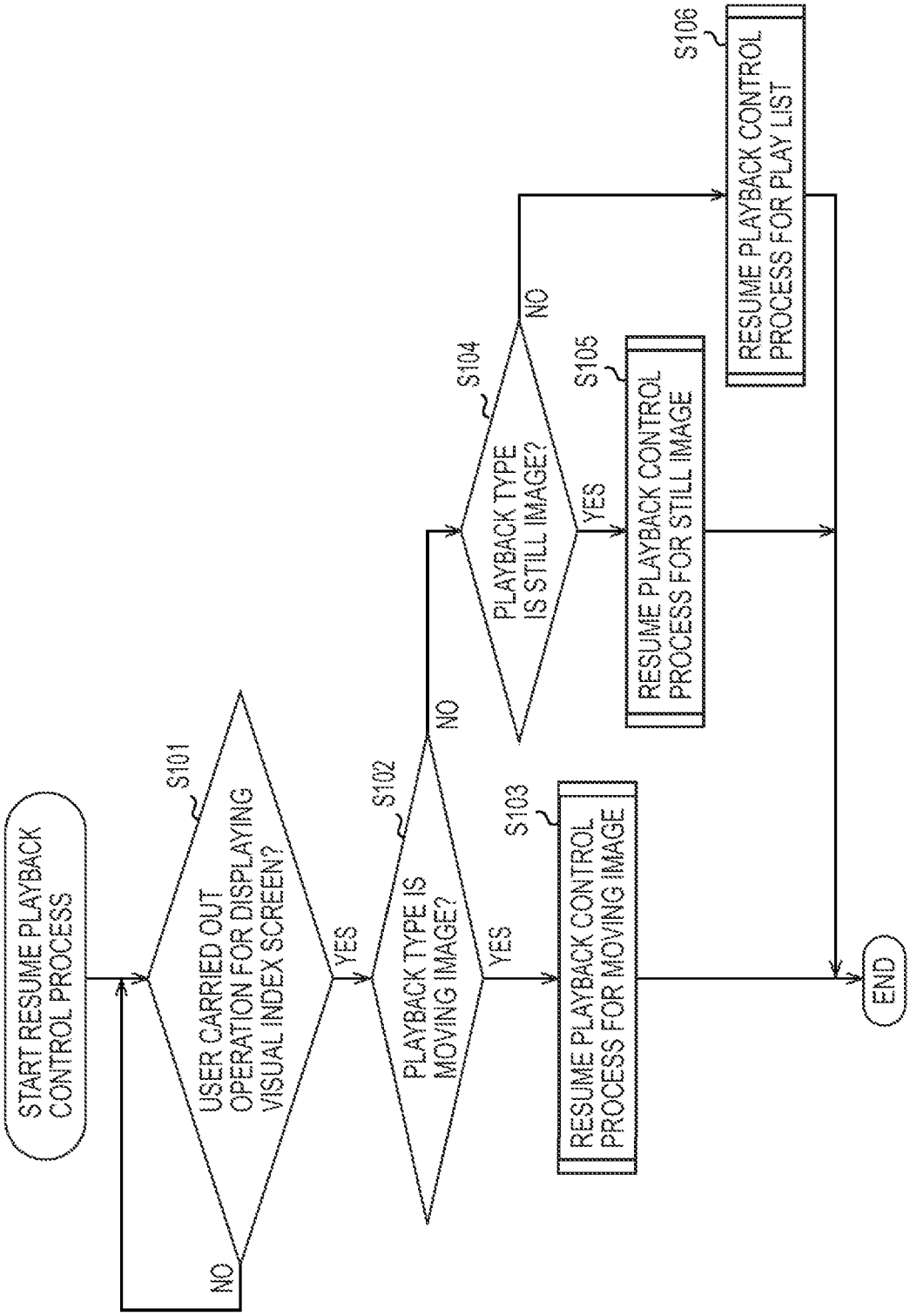
FIG. 10 is a flow chart illustrating the process for determining a playback type.

The resume playback control process will be described with reference to the flow chart in FIG. 10.

In Step S101, the operation determining unit 214 determines whether the user has carried out operation to display the visual index screen on the basis of a signal sent from the touch panel 152.

For example, in Step S101, if the user selects the moving image tab 306 among the moving image tab 306, the still image tab 307, and the play list tab 308 on the visual index screen, the operation determining unit 214 determines that the visual index screen for moving images has been displayed on the basis of a signal sent from the touch panel 152.

In Step S101, if the operation determining unit 214 determines that the visual index screen has not been displayed, Step S101 is repeated until the visual index screen is displayed.

In Step S101, if the operation determining unit 214 determines that the visual index screen has been displayed, the process proceeds to Step S102. In Step S102, the playback type determining unit 211 receives the playback type information stored from the RAM 128 and determines whether the playback type information received from the RAM 128 corresponds to a moving image.

In Step S102, if the playback type determining unit 211 determines that the playback type information received from the RAM 128 corresponds to a moving image, the process proceeds to Step S103. In Step S103, the playback type determining unit 211 sends the playback type information corresponding to a moving image as the determination results. The control program 201 carries out the control process for resume playback of a moving image on the basis of the playback type information corresponding to a moving image received from the playback type determining unit 211. Then, the process is ended. Details of the control process for resume playback of a moving image will be described below.

In Step S102, the playback type determining unit 211 determines that the playback type information received from the RAM 128 does not correspond to a moving image, the process proceeds to Step S104. In Step S104, the playback type determining unit 211 determines whether the playback type information received from the RAM 128 corresponds to a still image.

In Step S104, if the playback type determining unit 211 determines that the playback type information received from the RAM 128 corresponds to a still image, the process proceeds to Step S105. In Step 105, the playback type determining unit 211 sends the playback type information corresponding to a still image to the control program 201 as the determination results. The control program 201 carries out the control process for resume playback of a still image on the basis of the playback type information corresponding to still images received from the playback type determining unit 211. Then, the process is ended. Details of the control process for resume playback of a still image will be described below.

In Step S104, the playback type determining unit 211 determines that the playback type information received from the RAM 128 does not correspond to a still image, the process proceeds to Step S106. In Step S106, the playback type determining unit 211 sends the playback type information corresponding to a play list to the control program 201 as the determination results. The control program 201 carries out the control process for resume playback of play list on the basis of the playback type information corresponding to a play list received from the playback type determining unit 211. Then, the process is ended. Details of the control process for resume playback of a play list will be described below.

Figure 11:
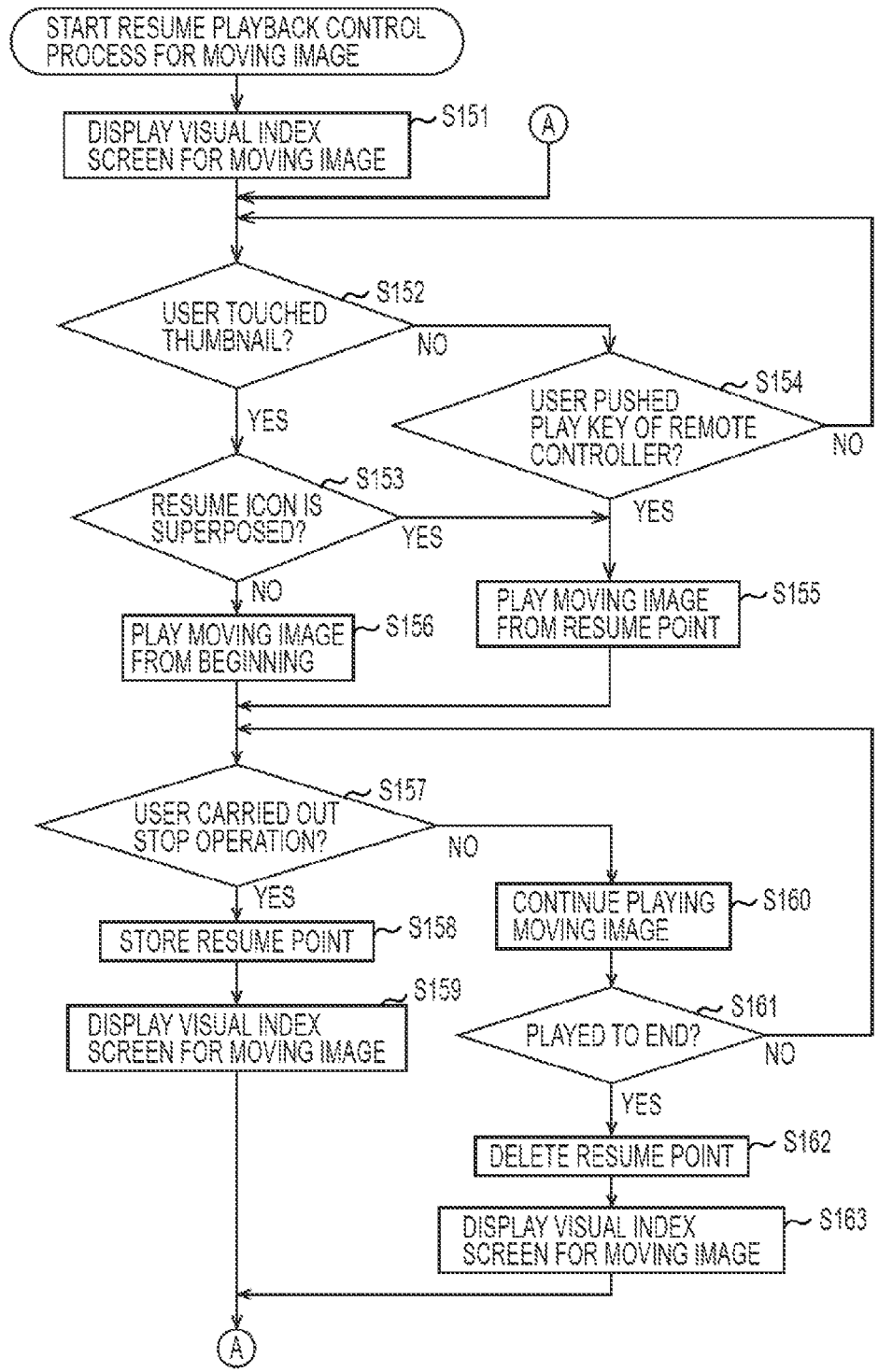
FIG. 11 is a flow chart illustrating the control process for resume playback of a moving image.

Next, details of the control process for resume playback of a moving image carried out in Step S103 will be described with reference to the flow chart in FIG. 11.

In Step S151, the screen display control unit 213 displays thumbnail images in the thumbnail display areas on the basis of the image data of a moving image stored on the optical disk 162 loaded in the digital video camera 101 and resume information (i.e., information on playback type and resume point) stored in the RAM 128. In this way, the screen display control unit 213 displays a visual index screen for moving images on the color liquid crystal display unit 151. The screen display control unit 213 superposes a resume icon on a predetermined thumbnail image displayed in one of thumbnail display areas.

For example, in Step S151, the screen display control unit 213 displays thumbnail images in the thumbnail display areas 301-1 to 301-6 on the basis of the image data for moving images stored on the optical disk 162 loaded in the digital video camera 101, the playback type information corresponding to a moving image stored in the RAM 128, and a resume point representing time tb that represent a moment in the chapter 2. A visual index screen for moving images is displayed on the color liquid crystal display unit 151 (for example, a visual index screen for moving images shown in the upper left area of FIG. 5) wherein the resume icon 302 is superposed on the thumbnail image displayed in the thumbnail display area 301-2.

If the resume information does not include information on the point where the playback of the moving image was stopped, the screen display control unit 213 plays back the moving image from the beginning of the chapter 1. Therefore, in order to playback the moving image from a resume point, the resume icon 302 is superposed on the thumbnail image displayed in the thumbnail display area 301-1.

In Step S152, the operation determining unit 214 determines whether the user touched the thumbnail image displayed in the thumbnail display area on the visual index screen for moving images (i.e., whether the user pressed the touch panel 152) on the basis of a signal sent from the touch panel 152.

For example, in Step S152, the operation determining unit 214 determines whether the user touched a thumbnail image displayed in one of the thumbnail display areas 301-1 to 301-6 on the visual index screen for moving images (i.e., whether the user pressed the touch panel 152) on the basis of a signal sent from the touch panel 152.

In Step S152, if the user has touched a thumbnail image displayed in one of the thumbnail display areas, the process proceeds to Step S153. In Step S153, the resume information determining unit 215 determines whether a resume icon is superposed on a thumbnail image displayed in the thumbnail display area touched by the user on the basis of a signal sent from the touch panel 152.

For example, in Step S153, the resume information determining unit 215 determines whether the resume icon 302 is superposed on a thumbnail image displayed on one of the thumbnail display areas 301-1 to 301-6 of the visual index screen for moving images on the basis of a signal sent from the touch panel 152.

In Step S153, if the resume information determining unit 215 determines that a resume icon is superposed on the thumbnail image displayed in the thumbnail display area touched by the user, the process proceeds to Step S155. In Step S155, the playback processing unit 216 resumes playback of the moving image from the time when (point where) the moving image was stopped in the last operation on the basis of the image data of the moving image stored on the optical disk 162 loaded in the digital video camera 101 and the resume point stored in the RAM 128.

For example, in Step S155, the playback processing unit 216 resumes playback of the moving image from the time tb when the moving image was stopped in the last operation on the basis of the image data of the moving image and the time tb that represent a point in the chapter 2 representing the resume point stored in the RAM 128. In other words, the moving image is played back from the time tb that represent a point in the chapter 2.

In Step S153, if the resume information determining unit 215 determines that a resume icon is not superposed on a thumbnail image displayed on the thumbnail display area touched by the user, the process proceeds to Step S156. In Step S156, the playback processing unit 216 resumes playback of the moving image from the beginning of the chapter corresponding to the thumbnail image displayed on the thumbnail display area touched by the user on the basis of the image data of the moving image stored on the optical disk 162 loaded in the digital video camera 101.

For example, in Step S153, the playback processing unit 216 resumes playback of the moving image from the beginning of the chapter 5 corresponding to the thumbnail image displayed in the thumbnail display area 301-5 touched by the user on the basis of the image data of the moving image stored on the optical disk 162 loaded in the digital video camera 101. In other words, the moving image is played back from time t3 that is the time corresponding to the beginning of the chapter 5.

In Step S152, if the operation determining unit 214 determines that the user has not touched a thumbnail image displayed in one of the thumbnail display areas, the process proceeds to Step S154. In Step S154, the operation determining unit 214 determines whether the user pressed the PLAY key 259 of the remote controller 130 on the basis of a signal sent from the remote controller receptor 129.

In Step S154, if the operation determining unit 214 determines that the user pressed the PLAY key 259 of the remote controller 130, the process proceeds to Step S155. In Step S155, the playback processing unit 216 resumes playback of the moving image from the time when (point where) the moving image was stopped in the last operation on the basis of the image data of the moving image stored on the optical disk 162 loaded in the digital video camera 101 and the resume point stored in the RAM 128.

For example, in Step S155, the playback processing unit 216 resumes playback of the moving image from the time tb when the moving image was stopped in the last operation on the basis of the image data of the moving image and the time tb that represent a resume point in the chapter 2 stored in the RAM 128. In other words, the moving image is played back from the time tb that represent a point in the chapter 2.

In Step S154, if the operation determining unit 214 determines that the user has not pressed the PLAY key 259 of the remote controller 130, the process is returned to Step S152 and the above-described process is repeated. In other words, the above-described process is repeated until the user touches one of the thumbnail display areas 301-1 to 301-6 or presses the PLAY key 259 of the remote controller 130.

In Step S157, the operation determining unit 214 determines whether the user has carried out a stop operation on the basis of a signal sent from the touch panel 152.

For example, in Step S157, the operation determining unit 214 determines whether the user touched the STOP key 401 on the playback screen on the basis of a signal sent from the touch panel 152.

In Step S157, if the operation determining unit 214 determines that the user carried out a stop operation, the process proceeds to Step S158. In Step S158, the resume information storage control unit 212 stores a resume point corresponding to a subsequent playback-start point for the moving image in the RAM 128 on the basis of the image data of the moving image stored on the optical disk 162 loaded in the digital video camera 101 and a signal sent from the touch panel 152.

A resume point, as described above, is information corresponding to the subsequent playback-start point on the optical disk 162. For example, the resume point is stored in the RAM 128 as a time period between the playback point corresponding to the beginning of the optical disk 162 and the subsequent playback-start point.

For example, in Step S158, if the user touches the STOP key 401 midway through the playback of the chapter 6 (i.e., at time t2), the resume information storage control unit 212 stores a resume point corresponding to time t2 representing a point in the chapter 6 in the RAM 128 on the basis of the image data of the moving image stored on the optical disk 162 loaded in the digital video camera 101 and a signal sent from the touch panel 152.

In Step S159, the screen display control unit 213 displays thumbnail images in the thumbnail display areas on the basis of a moving image stored on the optical disk 162 loaded in the digital video camera 101 and resume information (i.e., playback type information and resume point) stored in the RAM 128. In this way, the screen display control unit 213 displays a visual index screen for moving images on the color liquid crystal display unit 151. The screen display control unit 213 superposes a resume icon on a predetermined thumbnail image displayed in one of the thumbnail display areas.

For example, in Step S159, the screen display control unit 213 displays thumbnail images in the thumbnail display areas 301-1 to 301-6 on the basis of the image data for moving images stored on the optical disk 162 loaded in the digital video camera 101, the playback type information corresponding to a moving image stored in the RAM 128, and a resume point representing time tb that represent a moment in the chapter 6. A visual index screen for moving images is displayed on the color liquid crystal display unit 151 (for example, a visual index screen for moving images shown in the upper left area of FIG. 7) wherein the resume icon 302 is superposed on the thumbnail image displayed in the thumbnail display area 301-6.

In Step S157, if the operation determining unit 214 determines that the user has not carried out a stop operation, the process proceeds to Step S160. In Step S160, the playback processing unit 216 continues to play back the moving image on the basis of the image data of the moving image stored on the optical disk 162 loaded in the digital video camera 101.

In Step S161, the playback processing unit 216 determines whether the moving image being played back has reached the end on the basis of the image data of the moving image recorded on the optical disk 162 loaded in the digital video camera 101.

In Step S161, if the playback processing unit 216 determines that the moving image has not been played to the end, the process returns to Step S157 and the above-described process is repeated.

In Step S161, if the playback processing unit 216 determines that the moving image is played to the end, the process proceeds to Step S162. In Step S162 the resume information storage control unit 212 deletes the resume point stored in the RAM 128. More specifically, if the moving image is played to the end, the resume information storage control unit 212 deletes the resume point stored in the RAM 128 since resume playback of the moving image is not to be carried out (i.e., next time, the moving image will be played back from the playback point at the beginning of the optical disk 162).

For example, in Step S162, the resume information storage control unit 212 deletes the resume point corresponding to time t2 representing a point in the chapter 6 stored in the RAM 128.

In Step S163, the screen display control unit 213 displays thumbnail images in the thumbnail display areas on the basis of the image data of a moving image stored on the optical disk 162 loaded in the digital video camera 101 and resume information (i.e., playback type information and resume point) stored in the RAM 128. In this way, the screen display control unit 213 displays a visual index screen for moving images on the color liquid crystal display unit 151. The screen display control unit 213 superposes a resume icon on a predetermined thumbnail image displayed in one of the thumbnail display areas. Then, the process is returned to Step S152 and the above-described process is repeated.

For example, in Step S163, the screen display control unit 213 displays thumbnail images in the thumbnail display areas 301-1 to 301-6 on the basis of the image data for moving images stored on the optical disk 162 loaded in the digital video camera 101, the playback type information corresponding to a moving image stored in the RAM 128, and a resume point corresponding to the beginning of the chapter 1. A visual index screen for moving images is displayed on the color liquid crystal display unit 151 (for example, a visual index screen for moving images shown in the upper left area of FIG. 7) wherein the resume icon 302 is superposed on the thumbnail image displayed in the thumbnail display area 301-1 since the moving image is played back from the beginning of the chapter 1.

Figure 12:
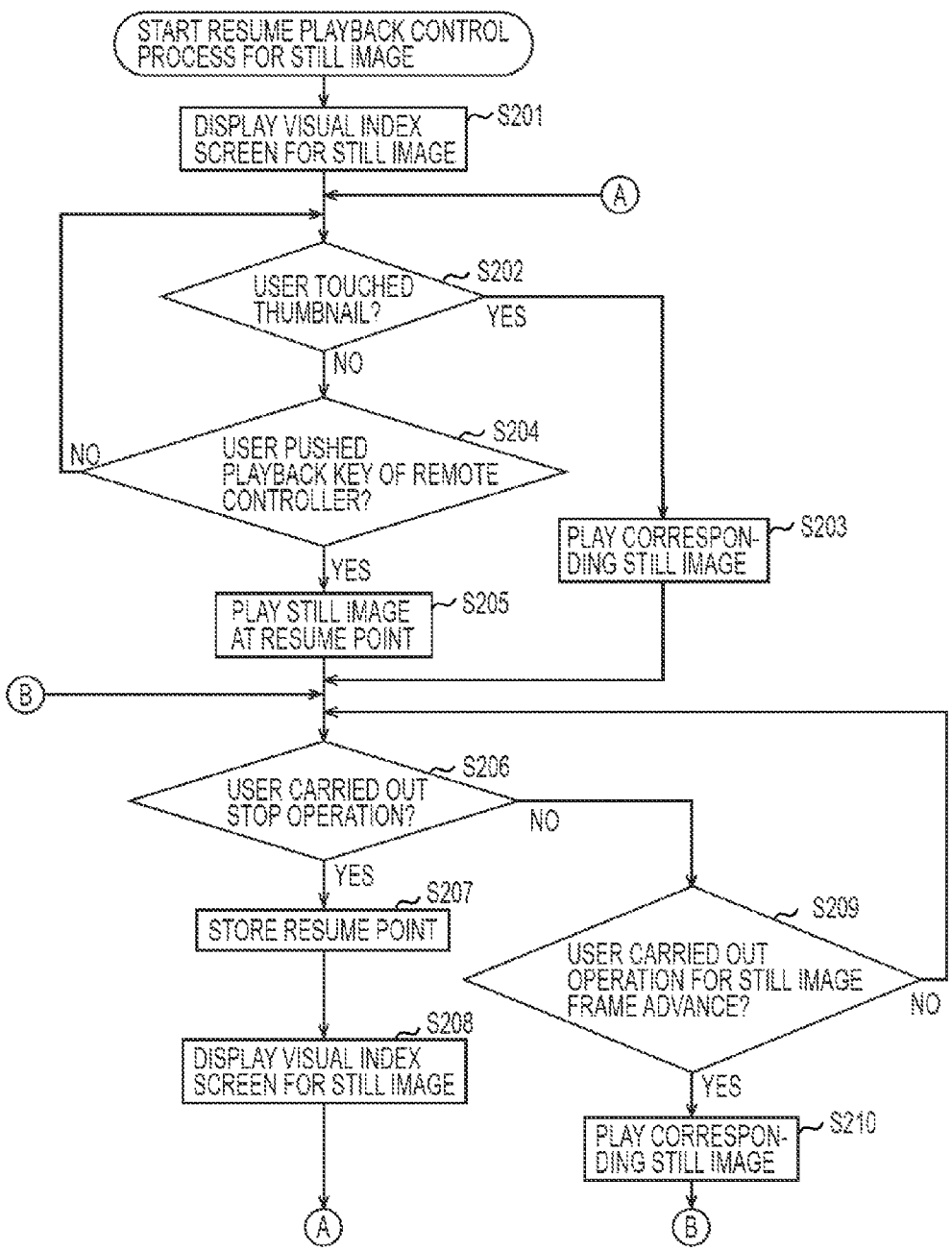
FIG. 12 is a flow chart illustrating the control process for resume playback of a still image.

Next, details of the control process for resume playback of still images carried out in Step S105 will be described with reference to the flow chart in FIG. 12.

In Step S201, the screen display control unit 213 displays thumbnail images in the thumbnail display area on the basis of the image data of still images stored on the optical disk 162 loaded in the digital video camera 101 and resume information (i.e., playback type information and resume point) stored in the RAM 128. In this way, the screen display control unit 213 displays a visual index screen for still images on the color liquid crystal display unit 151. The screen display control unit 213 superposes a resume icon on a predetermined thumbnail image displayed in one of the thumbnail display areas.

For example, in Step S201, the screen display control unit 213 displays thumbnail images in the thumbnail display areas 321-1 to 321-6 on the basis of the image data for moving images stored on the optical disk 162 loaded in the digital video camera 101, the playback type information corresponding to a still image stored in the RAM 128, and a resume point corresponding to the chapter 5. A visual index screen for still images is displayed on the color liquid crystal display unit 151 (for example, a visual index screen for still images shown in the upper right area of FIG. 5) wherein the resume icon 322 is superposed on the thumbnail image displayed in the thumbnail display area 321-5.

In Step S202, the operation determining unit 214 determines whether the user touched a thumbnail image displayed in one of the thumbnail display areas on the visual index screen for still images (i.e., whether the user touched the touch panel 152) on the basis of a signal sent from the touch panel 152.

For example, in Step S202, the operation determining unit 214 determines whether the user touched a thumbnail image displayed in one of the thumbnail display areas 321-1 to 321-6 on the visual index screen for still images (i.e., whether the user touched the touch panel 152) on the basis of a signal sent from the touch panel 152.

In Step S202, if the operation determining unit 214 determines that the user touched a thumbnail image displayed in a thumbnail display area on the visual index screen for still images, the process proceeds to Step S203. In Step S203, the playback processing unit 216 plays back the still images from the still image corresponding to the thumbnail image displayed in the thumbnail display area touched by the user.

In Step S202, if the operation determining unit 214 determines that the user has not touched a thumbnail image displayed in the thumbnail display areas on the visual index screen for still images, the process proceeds to Step S204. In Step S204, the operation determining unit 214 determines whether the user pressed the PLAY key 259 of the remote controller 130 on the basis of a signal sent from the remote controller receptor 129.

In Step S204, if the operation determining unit 214 determines that the user pressed the PLAY key 259 of the remote controller 130, the process proceeds to Step S205. In Step S205, the playback processing unit 216 resumes playback of the still images from the time when (point where) the still images were stopped in the last operation on the basis of the image data of the still images stored on the optical disk 162 loaded in the digital video camera 101 and the resume point stored in the RAM 128.

For example, in Step S205, the playback processing unit 216 resumes playback of the still images from the chapter where the still images was stopped in the last operation on the basis of the image data of the still images and the resume point corresponding to the chapter 5 stored in the RAM 128. In other words, playback of the still images is resumed from the chapter 5.

In Step S204, if the operation determining unit 214 determines that the user has not pressed the PLAY key 259 of the remote controller 130, the process returns to Step S202 and the above-described process is repeated. More specifically, the above-described process is repeated until the user touches one of the thumbnail display areas 321-1 to 321-6 or the user presses the PLAY key 259 of the remote controller 130.

In Step S206, the operation determining unit 214 determines whether the user carried out a stop operation on the basis of a signal sent from the touch panel 152.

For example, in Step S206, the operation determining unit 214 determines whether the user touched the STOP key (not shown) on the playback screen for the still images (i.e., whether the user pressed the touch panel 152) on the basis of a signal sent from the touch panel 152.

In Step S206, if the operation determining unit 214 determines that the user carried out a stop operation, the process proceeds to Step S207. In Step S207, the resume information storage control unit 212 stores the subsequent playback-start point as a resume point in the RAM 128 on the basis of the image data for the still images stored in the optical disk 162 loaded in the digital video camera 101 and a signal sent from the touch panel 152.

For example, in Step S207, if the user touches the STOP key (not shown) at the chapter 6, the resume information storage control unit 212 stores the information corresponding to the chapter 6 as a resume point in the RAM 128 on the basis of the image data of the still images recorded on the optical disk 162 loaded in the digital video camera 101 and a signal sent from the touch panel 152.

In Step S208, the screen display control unit 213 displays thumbnail images in the thumbnail display areas on the basis of the image data of the still images stored on the optical disk 162 loaded in the digital video camera 101 and resume information (i.e., playback type information and resume point) stored in the RAM 128. In this way, the screen display control unit 213 displays a visual index screen for still images on the color liquid crystal display unit 151. The screen display control unit 213 superposes a resume icon on a predetermined thumbnail image displayed in a thumbnail display area.

For example, in Step S208, the screen display control unit 213 displays thumbnail images in the thumbnail display areas 321-1 to 321-6 on the basis of the image data for moving images stored on the optical disk 162 loaded in the digital video camera 101, the playback type information corresponding to a still image stored in the RAM 128, and a resume point corresponding to the chapter 6. A visual index screen for still images is displayed on the color liquid crystal display unit 151 wherein the resume icon 322 is superposed on the thumbnail image displayed in the thumbnail display area 321-6.

In Step S206, if the operation determining unit 214 determines that the user has not carried out a stop operation, the process proceeds to Step S209. In Step S209, the operation determining unit 214 determines whether the user carried out an operation for still image frame advance on the basis of a signal sent from the touch panel 152.

For example, in Step S209, the operation determining unit 214 determines whether the user touched a STILL IMAGE FRAM ADVANCE key (not shown) (i.e., whether the user pressed the touch panel 152) on the basis of a signal sent from the touch panel 152.

In Step S209, if the operation determining unit 214 determines that the user carried out an operation for still image frame advance, the process proceeds to Step S210. In Step 210, the playback processing unit 216 plays back the still images by frame advance. Then, the process returns to Step S206, and the above-described process is repeated.

In Step s209, if the operation determining unit 214 determines that the user did not carried out an operation for still image frame advance, the process returns to Step S206. Then, the above-described process is repeated.

Figure 13:
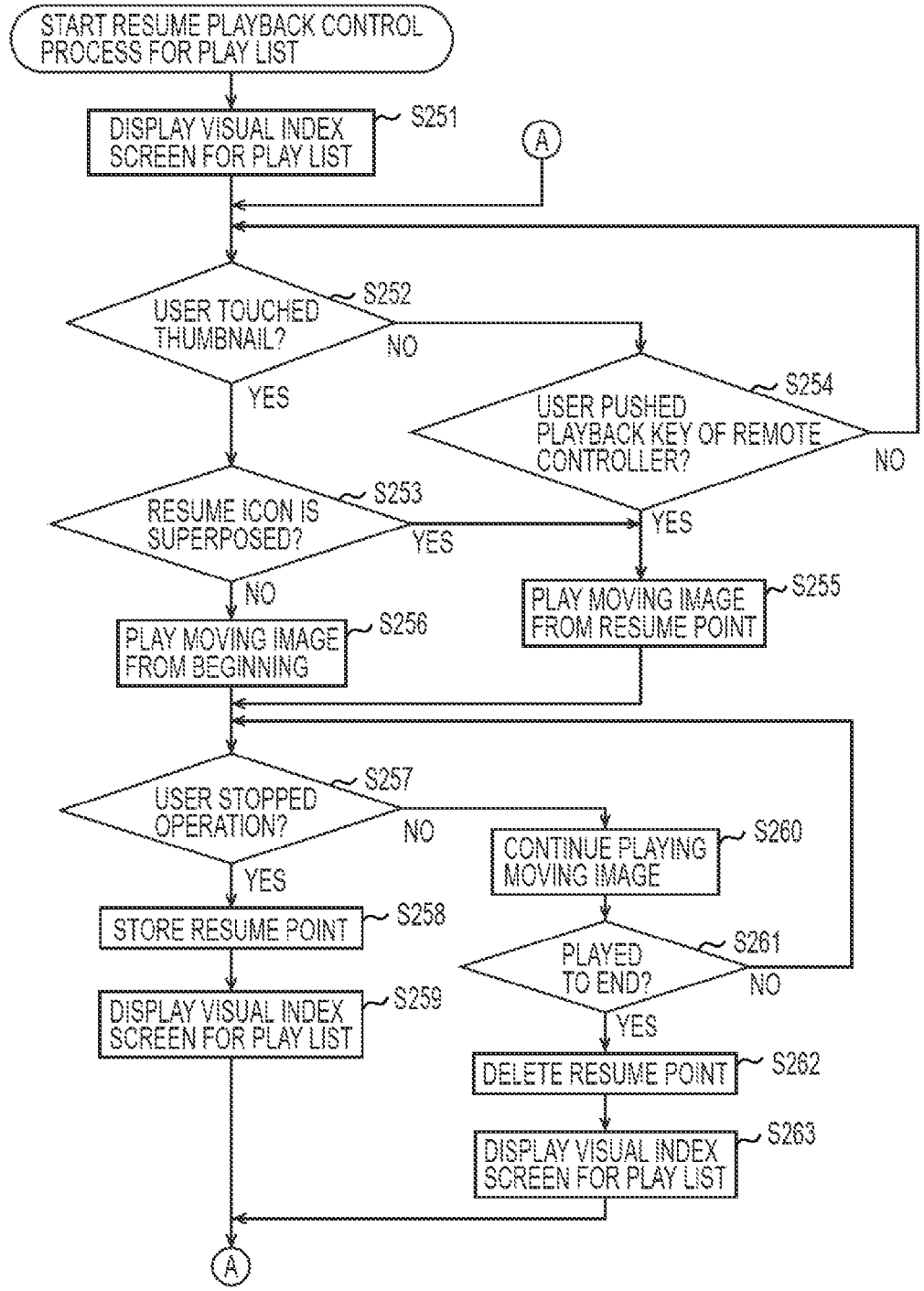
FIG. 13 is a flow chart illustrating the control process for resume playback of play list.

Next, details of the control process for resume playback of a play list carried out in Step S106 will be described with reference to the flow chart in FIG. 13. The flow chart in FIG. 13 illustrates a case in which a moving image listed in a play list is to be played back.

In Step S251, the screen display control unit 213 displays thumbnail images in the thumbnail display areas on the basis of the image data of the moving image or the still images stored on the optical disk 162 loaded in the digital video camera 101 and resume information (i.e., information on the playback type and resume point) stored in the RAM 128. In this way, the screen display control unit 213 displays a visual index screen for a play list on the color liquid crystal display unit 151. The screen display control unit 213 superposes a resume icon on a predetermined thumbnail image displayed in one of the thumbnail display areas.

For example, in Step S251, the screen display control unit 213 displays thumbnail images in the thumbnail display areas 341-1 to 341-6 on the basis of the image data for the moving image or the still images stored on the optical disk 162 loaded in the digital video camera 101, the playback type information corresponding to a play list stored in the RAM 128, and a resume point corresponding to a time tc that represent a point in the middle of the chapter 2. A visual index screen for still images is displayed on the color liquid crystal display unit 151 (for example, a visual index screen for still images shown in the lower left area of FIG. 5) wherein the resume icon 342 is superposed on the thumbnail image displayed in the thumbnail display area 341-2.

In Step S252, the operation determining unit 214 determines whether the user touched a thumbnail image displayed in one of the thumbnail display areas of the visual index screen for a play list (i.e., whether the user pressed the touch panel 152) on the basis of a signal sent from the touch panel 152.

For example, in Step S252, the operation determining unit 214 determines whether the user touched a thumbnail image displayed in one of the thumbnail display areas 341-1 to 341-6 (i.e., whether the user pressed the touch panel 152) on the visual index screen for a play list on the basis of a signal sent from the touch panel 152.

In Step S252, if the operation determining unit 214 determines that the user touched a thumbnail image, the process proceeds to Step S253. In Step S253, the resume information determining unit 215 determines whether a resume icon is superposed on the thumbnail image displayed in the thumbnail display area touched by the user.

For example, in Step S253, the resume information determining unit 215 determines whether the resume icon 342 is superposed on the thumbnail image displayed in the one of the thumbnail display areas 341-1 to 341-6.

In Step S253, if the resume information determining unit 215 determines that a resume icon is superposed on the thumbnail image displayed in a thumbnail display area touched by the user, the process proceeds to Step S255. In Step S255, the playback processing unit 216 resumes playback of the moving image from the time when (point where) the moving image was stopped in the last operation on the basis of the image data of the moving image stored on the optical disk 162 loaded in the digital video camera 101 and the resume point stored in the RAM 128.

For example, in Step S255, playback processing unit 216 resumes playback of the moving image from time tc that corresponds to the time the moving image was stopped in the last operation on the basis of the image data of the moving image and the time tc that represent a resume point in the chapter 2 stored in the RAM 128. In other words, the moving image is played back from time tc representing a point in the chapter 2.

In Step S253, if the resume information determining unit 215 determines that a resume icon is not superposed on a thumbnail image displayed in the thumbnail display area touched by the user, the process proceeds to Step S256. In Step S256, the playback processing unit 216 resumes playback of the moving image from the beginning of the chapter corresponding to the thumbnail image displayed in a thumbnail display area touched by the user on the basis of the image data of the moving image stored on the optical disk 162 loaded in the digital video camera 101.

For example, in Step S253, if the thumbnail image displayed in the thumbnail display area 341-5 is touched by the user, the playback processing unit 216 resumes playback of the moving image from the beginning of the chapter 5 corresponding to the thumbnail image displayed in thumbnail display area 341-5 touched by the user on the basis of the image data of the moving image stored on the optical disk 162 loaded in the digital video camera 101.

In Step S252, if the operation determining unit 214 determines that the user has not touched the thumbnail image displayed in one of the thumbnail display areas, the process proceeds to Step S254. In Step S254, the operation determining unit 214 determines whether the user pressed the PLAY key 259 of the remote controller 130 on the basis of a signal sent from the remote controller receptor 129.

In Step S254, if the operation determining unit 214 determines that the user pressed the PLAY key 259 of the remote controller 130, the process proceeds to Step S255. In Step S255, the playback processing unit 216 resumes playback of the moving image from the time when (point where) the moving image was stopped in the last operation on the basis of the image data of the moving image stored on the optical disk 162 loaded in the digital video camera 101 and the resume point stored in the RAM 128.

For example, in Step S255, the playback processing unit 216 resumes playback of the moving image from time tc corresponding to the time when the moving image was stopped in the last operation on the basis of the image data of the moving image and the time tc representing a resume point in the chapter 2 stored in the RAM 128. In other words, the moving image is played back from time tc corresponding to a point in the chapter 2.

In Step S254, if the operation determining unit 214 determines that the user did not press the PLAY key 259 of the remote controller 130, the process returns to Step S252 and the above-described process is repeated. In other words, the above-described process is repeated until the user touches one of the thumbnail display areas 341-1 to 341-6 or presses the PLAY key 259 of the remote controller 130.

In Step S257, the operation determining unit 214 determines whether the user carried out a stop operation on the basis of a signal sent from the touch panel 152.

For example, in Step S257, the operation determining unit 214 determines whether the user touched the STOP key (not shown) on the playback screen for the still images (i.e., whether the user pressed the touch panel 152).

In Step S257, if the operation determining unit 214 determines that the user carried out a stop operation, the process proceeds to Step S258. In Step S258, the resume information storage control unit 212 stores the subsequent playback-start point as a resume point in the RAM 128 on the basis of the image data stored in the optical disk 162 loaded in the digital video camera 101 and a signal sent from the touch panel 152.

For example, in Step S258, if the user touches the STOP key (not shown) midway through the chapter 4 (i.e., at time td), the resume information storage control unit 212 stores the time td representing a point in the chapter 4 in the RAM 128 on the basis of the image data for the moving image stored on the optical disk 162 loaded in the digital video camera 101 and a signal sent from the touch panel 152.

In Step S259, the screen display control unit 213 displays thumbnail images in the thumbnail display areas on the basis of the image data of the moving image or the still images recorded on the optical disk 162 loaded in the digital video camera 101 and resume information (i.e., information on the playback type and resume point) stored in the RAM 128. In this way, the screen display control unit 213 displays a visual index screen for a play list on the color liquid crystal display unit 151. The screen display control unit 213 superposes a resume icon on a predetermined thumbnail image displayed in a thumbnail display area.

For example, in Step S259, the screen display control unit 213 displays thumbnail images in the thumbnail display areas 341-1 to 341-6 on the basis of the image data for the moving image stored on the optical disk 162 loaded in the digital video camera 101, the playback type information corresponding to the moving image or the still images stored in the RAM 128, and a resume point corresponding to a time td in the chapter 4. A visual index screen for still images is displayed on the color liquid crystal display unit 151 wherein the resume icon 342 is superposed on the thumbnail image displayed in the thumbnail display area 341-4.

In Step S257, the operation determining unit 214 determines that the user has not carried out a stop operation, the process proceeds to Step S260. In Step S260, the playback processing unit 216 continues the playback of the moving image on the basis of the image data recorded on the optical disk 162 loaded in the digital video camera 101.

In Step S261, the playback processing unit 216 determines whether the moving image is played back to the end on the basis of the image data recorded on the optical disk 162 loaded in the digital video camera 101.

In Step S261, if the playback processing unit 216 determines that the moving image is not played back to the end, the process retunes to Step S257 and the above-described process is repeated.

In Step S261, if the playback processing unit 216 determines that the moving image is played back to the end, the process proceeds to Step S262. In Step S262 the resume information storage control unit 212 deletes the resume point stored in the RAM 128. More specifically, if the moving image is played back to the end, the resume information storage control unit 212 deletes the resume point stored in the RAM 128 since resume playback of the moving image is not be carried out (i.e., next time, the moving image will be played back from the playback point at the beginning of the optical disk 162).

For example, in Step S262, the resume information storage control unit 212 deletes the resume point corresponding to time td in the chapter 4 stored in the RAM 128.

In Step S263, the screen display control unit 213 displays thumbnail images displayed in one of the thumbnail display areas on the basis of the image data of the moving image or the still images stored on the optical disk 162 loaded in the digital video camera 101 and resume information (i.e., information on the playback type and resume point) stored in the RAM 128. In this way, the screen display control unit 213 displays a visual index screen for a play list on the color liquid crystal display unit 151. The screen display control unit 213 superposes a resume icon on a predetermined thumbnail image displayed in one of the thumbnail display areas. Then, the process is returned to Step S252, and the above-described process is repeated.

For example, in Step S263, the screen display control unit 213 displays thumbnail images in the thumbnail display areas 341-1 to 341-6 on the basis of the image data for the moving image stored on the optical disk 162 loaded in the digital video camera 101, the playback type information corresponding to the moving image or still images stored in the RAM 128, and a resume point corresponding to the beginning of the chapter 1. A visual index screen for still images is displayed on the color liquid crystal display unit 151 wherein the resume icon 342 is superposed on the thumbnail image displayed in the thumbnail display area 341-1 since the moving image is played back from the beginning of the chapter 1.

FIG. 13 illustrates a case in which a moving image listed in a play list is played back. As described above, still images may be listed in the play list as well. To play back still images listed in the play list, a process similar to the control process for resume playback of a still image described with reference to the flow chart in FIG. 12 is carried out.

Next, further details of the resume playback function of the digital video camera 101 according to an embodiment of the present invention will be described with reference to FIGS. 14 to 18.

First, the overview of the resume playback function will be described with reference to FIG. 14. In FIG. 14, the three boxes aligned vertically represent, for the top, a moving image 501 (top box) recorded on the optical disk 162 loaded in the digital video camera 101, a still image 502 (middle box), and a play list 503 (bottom box).

Playback type information 511 corresponds to, for example, moving image, still image, or play list. For example, as described above with reference to FIG. 5, if the moving image tab 306 is selected, the playback type information 511 moves to the top box to indicate the moving image 501. If the still image tab 307 is selected, the playback type information 511 moves to the middle box to indicate the still image 502. If the play list tab 308 is selected, the playback type information 511 moves to the bottom box to indicate the play list 503.

A resume point 512-1 is information corresponding to the subsequent playback-start point of the moving image 501. For example, the resume point is stored in the RAM 128 as the time from the playback point at the beginning of the optical disk 162 to the subsequent playback-start point. More specifically, if the user touches a thumbnail display area where a thumbnail image corresponding to the chapter where the resume point 512-1 is provided (i.e., if the user presses the touch panel 152), the moving image is played back from the resume point 512-1.

A resume point 512-2 is information corresponding to the subsequent playback-start point of the still image 502. For example, the resume point is stored in the RAM 128 as the time from the playback point at the beginning of the optical disk 162 to the subsequent playback-start point. More specifically, if the user touches a thumbnail display area where a thumbnail image corresponding to the chapter where the resume point 512-2 is provided (i.e., if the user presses the touch panel 152), the moving image is played back from the resume point 512-2.

A resume point 512-3 is information corresponding to the subsequent playback-start point of the play list 503. For example, the resume point is stored in the RAM 128 as the time from the playback point at the beginning of the optical disk 162 to the subsequent playback-start point. More specifically, if the user touches a thumbnail display area where a thumbnail image corresponding to the chapter where the resume point 512-3 is provided (i.e., if the user presses the touch panel 152), the play list (moving image or still images) is played back from the resume point 512-3.

As described above, the playback type information 511 and the resumes points 512-1 to 512-3 are collectively referred to as resume information.

In this way, the moving image 501, the still image 502, and the play list 503 have the resume point 512-1, the resume point 512-2, and the resume point 512-3, respectively, stored in the RAM 128. Therefore, the moving image 501, the still image 502, and the play list 503 can be played back from their subsequent playback-start points. As a result, the operation for resume playback of the digital video camera 101 can be improved.

Next, resetting or clearing of the resume information will be described with reference to FIG. 15. The components in FIG. 15 that are the same as those in FIG. 14 are represented by the same reference numerals and descriptions thereof are omitted.

When the resume information is reset, the playback type information 511 moves to the top box and indicates the moving image 501. When the resume information is cleared, the resume point 512-1, the resume point 512-2, and the resume point 512-3 are moved to the left end of the moving image 501, the still image 502, and the play list 503, respectively, i.e., the resume point 512-1, the resume point 512-2, and the resume point 512-3 are moved to playback points at the beginning of the moving image 501, the still image 502, and the play list 503, respectively.

In the digital video camera 101 according to an embodiment of the present invention, for example, the resume information is reset or cleared when an initializing process is carried out, when a finalizing (unfinilizing) process is carried out, when the optical disk 162 is ejected, when universal serial bus (USB) mode is entered by connecting to a personal computer, when a disk is recovered (for example, a process carried out when write-in to the optical disk 162 fails), a drive error or a system error occurs, or when condensation occurs.

Next, transition of the resume information is described with reference to FIG. 16. The components in FIG. 16 that are the same as those in FIGS. 14 and 15 are represented by the same reference numerals and some of the descriptions thereof are omitted.

First, the transition of playback type information 511 will be described. As described above, the playback type information 511 indicates one of the moving image 501, the still image 502, and the still image 502 and is moved in accordance with the user's operation.

The playback type information 511 moves to the top box and indicates the moving image 501, for example, when the user carries out an operation for recording a moving image or selects the moving image tab 306 on the visual index screen. In other words, the playback type information 511 is set to a moving image.

The playback type information 511 moves to the middle box and indicates the still image 502, for example, when the user carries out an operation for recording a still image or selects the still image tab 307 on the visual index screen. In other words, the playback type information 511 is set to a still image.

The playback type information 511 moves to the bottom box and indicates the play list 503, for example, when the user selects the play list tab 308 on the visual index screen. In other words, the playback type information 511 is set to a play list.

Next, the transition of the resume point 512-1, the resume point 512-2, and the resume point 512-3 will be described. The resume point 512-1, the resume point 512-2, and the resume point 512-3 indicate the moving image 501, the still image 502, and the play list 503, respectively.

The resume point 512-1 indicates the position, for example, where the user stopped the moving image being played back or recorded the moving image.

More specifically, for example, the resume point 512-1 is stored in the RAM 128 as the time from the first playback point on the optical disk 162 to the resume point 512-1 when the moving image being played back is stopped by the user. If the user records a moving image, the resume point 512-1 is stored in the RAM 128 as the time from the first playback point on the optical disk 162 to the beginning of the chapter indicated by the resume point 512-1.

In this way, when the moving image being played back is stopped, the moving image can be played back again from the subsequent playback-start point. When a moving image is recorded, the recorded moving image can be confirmed immediately (can be deleted if the recorded moving image is unwanted) after the moving image is recorded (i.e., captured).

The resume point 512-1, for example, moves the moving image 501 to the left end and indicates the playback point at the beginning when the user deletes a review (i.e., as described above, when the user confirms the recorded moving image and deletes the recorded moving image) or when the moving image is played back to the end. In other words, the resume point 512-1 is cleared.

The resume point 512-2 indicates the position, for example, where the user stopped the still images being played back or recorded a still image.

More specifically, for example, the resume point 512-2 is stored in the RAM 128 as the time from the first playback point on the optical disk 162 to the resume point 512-2 when the still images being played back are stopped by the user or when the user records a still image.

In this way, when the still images being played back are stopped, the still images can be played back again from the subsequent playback-start point. When a still image is recorded, the recorded moving image can be confirmed immediately (can be deleted if the recorded moving image is unwanted) after the moving image is recorded (i.e., captured).

The resume point 512-2, for example, moves the still image 502 to the left end and indicates the playback point at the beginning when the user deletes a review (i.e., as described above, when the user confirms the recorded still image and deletes the recorded still image) or when the still images are played back to the end. In other words, the resume point 512-2 is cleared.

The resume point 512-3 indicates the position, for example, where the user stopped the play list being played back. More specifically, for example, the resume point 512-3 is stored in the RAM 128 as the time from the first playback point on the optical disk 162 to the resume point 512-3 when the play list being played back is stopped.

In this way, when the play list being played back is stopped, the play list can be played back again from the subsequent playback-start point.

The resume point 512-3, for example, moves the play list 503 to the left end and indicates the playback point at the beginning when the user deletes a review. In other words, the resume point 512-3 is cleared.

Next, transition of the resume information after an editing process is carried out will be described with reference to FIG. 17. The components in FIG. 17 that are the same as those in FIGS. 14 to 16 are represented by the same reference numerals and some of the descriptions thereof are omitted.

When an editing process is carried out, the playback type information 511 is set one of the moving image 501, the still image 502, and the play list 503, whichever is most suitable.

More specifically, for example, if an editing process, such as deleting a moving image or dividing a moving image, is carried out, the playback type information 511 is move to the top box to indicate the moving image 501. In other words, the playback type information 511 is set to a moving image.

For example, if an editing process, such as deleting a still image, is carried out, the playback type information 511 is move to the middle box to indicate the still image 502. In other words, the playback type information 511 is set to a still image.

For example, if an editing process, such as adding a moving image or a still image to a play list, deleting a play list or moving or dividing a chapter in a play list, is carried out, the playback type information 511 is move to the bottom box to indicate the play list 503. In other words, the playback type information 511 is set to a play list.

When an editing process is carried out, the resume point 512-1, the resume points 512-2, and the resume points 512-3 are moved to the left end of the moving image 501, the still image 502, and the play list 503, respectively, to indicate the first playback points. In other words, the resume points 512-1 to 512-3 are cleared.

The transition of the resume information when the optical disk 162 is loaded in a drive is described with reference to FIG. 18. The components in FIG. 18 that are the same as those in FIGS. 14 to 17 are represented by the same reference numerals and some of the descriptions thereof are omitted.

When the optical disk 162 is loaded in the drive, the playback type information 511 is set to one of the moving image 501, the still image 502, and the play list 503.

More specifically, for example, if both a moving image and a still image are recorded on the optical disk 162 loaded in the drive, the playback type information 511 is move to the top box to indicate the moving image 501. In other words, the playback type information 511 is set to a moving image.

If only a moving image is recorded on the optical disk 162 loaded in the drive, the playback type information 511 is move to the top box to indicate the moving image 501. In other words, the playback type information 511 is set to a moving image.

If only a still image is recorded on the optical disk 162 loaded in the drive, the playback type information 511 is move to the middle box to indicate the still image 502. In other words, the playback type information 511 is set to a still image.

If neither a moving image nor a still image is recorded on the optical disk 162 loaded in the drive, the playback type information 511 is move to the top box to indicate the moving image 501. In other words, the playback type information 511 is set to a moving image.

At this time, the resume point 512-1, the resume points 512-2, and the resume points 512-3 are moved to the left end of the moving image 501, the still image 502, and the play list 503, respectively, to indicate the first playback points. In other words, when the optical disk 162 is loaded in the drive, the resume points of the moving image, the still image, and the play list indicate the first playback point.

As described above, the digital video camera 101 provides an interface screen that allows a user to intuitively carry out operations. In this way, the user can easily play back moving images (still images).

According to the digital video camera 101, since a plurality of resume points are maintained for each playback type, moving images and still images can be played back from the last point the images were stopped. In this way, the user can easily play back moving images (still images).

The resume information determining unit 215 according to the above-described embodiment determines whether or not to carry out resume playback by determining whether a resume icon is superposed on a thumbnail image corresponding to image data. However, instead, the resume information determining unit 215 may determine whether or not to carry out resume playback on the basis of a table that stores a playback-stop positions and image data set corresponding to these positions may be stored in the RAM 128.

More specifically, for example, the resume information storage control unit 212 relates the stop position indicating the position where the playback of an image was stopped and information indicating the image data that has been stopped and stores the stop position and information in the RAM 128 on the basis of image data stored on the optical disk 162 loaded in the digital video camera 101 and a signal sent from the touch panel 152 when the user touches the STOP key that represent a point in the middle of the playback of an image.

The resume information determining unit 215 determines whether or not to carry out resume playback on the basis of whether the image data corresponding to a thumbnail image displayed in the thumbnail display area touched by the user matches the information in the table stored in the RAM 128 indicating the stop position.

In other words, the method for the resume information determining unit 215 to determine whether or not to carry out resume playback is not limited to the method in which the resume information determining unit 215 determines whether or not to carry out resume playback on the basis on whether or not a resume icon is superposed on a thumbnail image corresponding to image data.

Each step of the above-described process may be carried out by hardware or software. To carry out the steps of the process by software, the program constituting the software is installed from a recording medium into a computer equipped with specialized hardware or, for example, a multi-purpose personal computer capable of executing various functions by installing various programs.

As illustrated in FIG. 2, the recording medium is not only constituted of a packaged medium, such as the magnetic disk 161 (which may also be a flexible disk) storing a program, the optical disk 162 (which may also be a compact disc-read only memory (CD-ROM)), the magneto-optical disk 163 (which may also be a MiniDisk (MD) (registered trademark of Sony Corporation)), or the semiconductor memory 164, distributed to users to provide programs but also constituted of a ROM (not shown in the drawings) for storing programs that is provided to users together with the computer it is installed.

The program for carrying of the above-described steps may be installed in a computer through wire communication or wireless communication media, such as a local area network, the Internet, or digital satellite broadcasting, via an interface, such as a router or a modem, if required.

The steps for executing the program stored in the recording medium according to an embodiment of the present invention may be executed in the same sequence as described above. However, the steps for executing the program stored in the recording medium according to an embodiment of the present invention do not necessarily have to be executed in the same sequence as described above and may be executed simultaneously or individually.

It should be understood by those skilled in the art that various modifications, combinations, sub-combinations and alterations may occur depending on design requirements and other factors insofar as they are within the scope of the appended claims or the equivalents thereof.

The invention claimed is:

1. An information processing apparatus, comprising:
   a storage control unit configured to retrieve image data and position information which indicates a position at which a reproduction of the image data is stopped; and
   a display control unit configured to:
      control a display device to display at least one of a plurality of visual index screens,
      wherein the plurality of visual index screens display a plurality of types of the image data,
      wherein each of the plurality of visual index screens displays at least one of the plurality of types of the image data;
      wherein each of the plurality of visual index screens displays a list of thumbnail images corresponding to a plurality of chapters,
      wherein the list of thumbnail images is displayed in an order in which the plurality of chapters were recorded, and
      wherein each of the plurality of chapters corresponds to a plurality of image data,
      control the display device to display an icon superposed on a first thumbnail image from the list of thumbnail images,
      wherein the icon is displayed on the first thumbnail image, based on a stop of the reproduction of the image data at a position within a chapter corresponding to the first thumbnail image, and
      wherein the icon is displayed at a time at which the reproduction of the image data is stopped at the position within the chapter corresponding to the first thumbnail image.

2. The information processing apparatus according to claim 1, further comprising a receiving unit configured to receive a user operation indicating the stop of the reproduction of the image data.

3. The information processing apparatus according to claim 2, wherein the user operation is initiated by a remote controller.

4. The information processing apparatus according to claim 1, wherein the image data is reproduced from the position at which the reproduction of the image data is stopped, based on the icon that is superposed on the first thumbnail image and an operation to start the reproduction of the image data carried out based on the image data that is prevented from the reproduction.

5. The information processing apparatus according to claim 1,
   wherein the plurality of types of the image data are a moving image, a still image, and a play list,
   wherein the play list includes at least one of moving images or still images and the play list is used to play back the moving images and the still images in an order of selection, and
   wherein the storage control unit is further configured to store the plurality of types of the image data based on the image data that is being reproduced and based on the image data that is stopped from the reproduction.

6. The information processing apparatus according to claim 5,
   wherein the display control unit is further configured to control the plurality of visual index screens, to display the list of thumbnail images with each of the plurality of types of the image data.

7. The information processing apparatus according to claim 5,
   wherein the storage control unit is further configured to store a plurality of reproduction positions for each of the plurality of types of the image data based on respective type of the image data that is stopped from the reproduction.

8. The information processing apparatus according to claim 1, wherein the image data is reproduced from beginning based on the icon that is prevented from being superposed on a second thumbnail image from the list of thumbnail images and based on an operation for start of the reproduction of the image data is carried out.

9. The information processing apparatus according to claim 1, further comprising:
   a playback type determining unit configured to determine a type of the image data from the plurality of types of the image data, wherein the type of the image data is one of a moving image, a still image, or a play list, and
   wherein the play list includes at least one of moving images or still images and the play list is used to play back the moving images and the still images in an order of selection.

10. The information processing apparatus according to claim 9, wherein the image data is reproduced from the position at which the reproduction of the image data is stopped based on the determined type of the image data.

11. The information processing apparatus according to claim 1, wherein a first visual index screen of the plurality of visual index screens displays a moving image type of the plurality of types of the image data, wherein a second visual index screen of the plurality of visual index screens displays a still image type of the plurality of types of image data, and wherein a third visual index screen of the plurality of visual index screens displays a play list image type of the plurality of types of image data.

12. The information processing apparatus according to claim 11, wherein the display control unit is further configured to select one of the first visual index screen, the second visual index screen, or the third visual index screen.

13. A method for reproducing image data, the method comprising:

in an information processing apparatus:

retrieving the image data and position information which indicates a position at which a reproduction of the image data is stopped;

displaying a plurality of types of the image data on a plurality of visual index screens, wherein each of the plurality of visual index screens displays at least one of the plurality of types of the image data;

displaying a list of thumbnail images corresponding to a plurality of chapters, wherein each of the plurality of chapters corresponds to a plurality of image data, and wherein the list of thumbnail images is displayed in an order in which the plurality of chapters were recorded; and displaying an icon superposed on a thumbnail image from the list of thumbnail images, on at least one of the plurality of visual index screens of the information processing apparatus, wherein the icon is displayed on the thumbnail image, based on the stopping of the reproduction of the image data at the position within a chapter corresponding to the thumbnail image, and wherein the icon is displayed at a time at which the reproduction of the image data is stopped at the position within the chapter corresponding to the thumbnail image.

14. A system for reproducing image data, comprising:

a reproducing apparatus loaded with a data recording medium including the image data, wherein the reproducing apparatus is operable to:

reproduce the image data;

retrieve the image data and position information which indicates a position at which the reproduction of the image data is stopped;

display a plurality of types of the image data on a plurality of visual index screens, wherein each of the plurality of visual index screens displays at least one of the plurality of types of the image data;

display a list of thumbnail images corresponding to a plurality of chapters, wherein each of the plurality of chapters corresponds to a plurality of image data, and wherein the list of thumbnail images is displayed in an order in which the plurality of chapters were recorded; and display an icon superposed on a thumbnail image from the list of thumbnail images, on at least one of the plurality of visual index screens of the reproducing apparatus, wherein the icon is displayed on the thumbnail image based on the stop of the reproduction of the image data at the position within a chapter corresponding to the thumbnail image, and wherein the icon is displayed at a time at which the reproduction of the image data is stopped at the position within the chapter corresponding to the thumbnail image.

15. A non-transitory computer-readable medium having stored thereon computer-executable instructions that, when executed by a processor, cause a computer to execute operations, the operations comprising:

retrieving image data and position information which indicates a position at which a reproduction of the image data is stopped;

displaying a plurality of types of the image data on a plurality of visual index screens, wherein each of the plurality of visual index screens displays at least one of the plurality of types of the image data; and displaying a list of thumbnail images corresponding to a plurality of chapters, wherein each of the plurality of chapters corresponds to a plurality of image data, and wherein the list of thumbnail images is displayed in an order in which the plurality of chapters were recorded; and displaying an icon superposed on a thumbnail image from the list of thumbnail images, on at least one of the plurality of visual index screens, wherein the icon is displayed on the thumbnail image, based on the stopping of the reproduction of the image data at the position within a chapter corresponding to the thumbnail image, and wherein the icon is displayed at a time at which the reproduction of the image data is stopped at the position within the chapter corresponding to the first thumbnail image.

16. An information processing apparatus, comprising:

a plurality of visual index screens configured to display a plurality of types of image data, wherein each of the plurality of visual index screens is configured to display at least one of the plurality of types of image data; and a display control unit configured to:

control a display device to display a list of thumbnail images corresponding to the plurality of types of image data, wherein the list of thumbnail images corresponds to a plurality of chapters, and wherein the list of thumbnail images is displayed in an order in which the plurality of chapters were recorded, and control the display device to display an icon superposed on a thumbnail image from the list of thumbnail images, on at least one of the plurality of visual index screens of the information processing apparatus, wherein the display of the icon is controlled based on a reproduction of the plurality of types of image data that is stopped at a position within a chapter corresponding to the thumbnail image from the list of thumbnail images, wherein the icon is displayed at a time at which the reproduction of the plurality of types of image data is stopped at the position within the chapter corresponding to the thumbnail image, and wherein the thumbnail image corresponds to the plurality of types of image data which is stopped from the reproduction.

* * * * *